United States Patent [19]

Kolling et al.

[11] Patent Number: 5,920,847
[45] Date of Patent: *Jul. 6, 1999

[54] ELECTRONIC BILL PAY SYSTEM

[75] Inventors: Ray Kolling, Menlo Park; William L. Powar, Palo Alto, both of Calif.

[73] Assignee: Visa International Service Association, Foster City, Calif.

[*] Notice: This patent is subject to a terminal disclaimer.

[21] Appl. No.: 08/726,642

[22] Filed: Oct. 7, 1996

Related U.S. Application Data

[63] Continuation-in-part of application No. 08/552,586, Nov. 3, 1995, which is a continuation of application No. 08/146,515, Nov. 1, 1993, Pat. No. 5,465,206.

[51] Int. Cl.$^6$ ..................................................... G06F 17/60
[52] U.S. Cl. ................................. 705/40; 705/44; 705/45
[58] Field of Search .................................. 705/1, 30, 34, 705/35, 39, 40, 42, 44

[56] References Cited

U.S. PATENT DOCUMENTS

| | | |
|---|---|---|
| 4,270,042 | 5/1981 | Case . |
| 4,799,156 | 1/1989 | Shavit et al. . |
| 4,823,264 | 4/1989 | Deming . |
| 4,947,028 | 8/1990 | Gorog . |
| 5,093,787 | 3/1992 | Simmons . |
| 5,220,501 | 6/1993 | Lawlor et al. . |
| 5,283,829 | 2/1994 | Anderson . |

OTHER PUBLICATIONS

Michael P. Sullivan; Home Banking—The Ultimate Delivery System; The Bankers Magazine; pp. 40–42.

George C. White; The Reality—EFTS Is Here and Many Banks Are Missing It; United States Banker; pp. 48–49.

David O. Tyson; Banks in Denver, San Francisco to Offer Customers PC Links; Oct. 23, 1985.

Dale L. Reistad; The Prospects for ATM Program Changes Due to Debit Card, Chip Card and Home Terminal Development; Notes from ATM/3, BAI's Third National ATM Conference, New Orleans, LA; Nov. 16–19, 1980. pp. 144–146.

Rhea Dawson; Knoxville bank's TV banking appeals to upper–income consumers; Bank Systems & Equipment; Jul. 1981 pp. 47–49.

John F. Fisher; In–Home Banking Today and Tomorrow; Journal of Retail Banking; Jun. 1, 1982 pp. 23–30 vol. IV/2.

Debbie Guthrie Haer; Two–way cable TV to provide home banking in Omaha; Bank News; Feb. 15, 1982 pp. 9–10, 12 and 15.

(List continued on next page.)

*Primary Examiner*—Stephen R. Tkacs

[57] ABSTRACT

A bill pay system wherein participating consumers pay bills to participating billers through a payment network operating according to preset rules. The participating consumers receive bills from participating billers (paper/mail bills, e-mail notices, implied bills for automatic debits) which indicate an amount, and a unique biller identification number. To authorize a remittance, a consumer transmits to its participating bank a bill pay order indicating a payment date, a payment amount, the consumer's account number with the biller, a source of funds and the biller's biller identification number, either directly or by reference to static data containing those data elements. Bank C then submits a payment message to a payment network, and the payment network, which assigns the biller reference numbers, forwards the payment message to the biller's bank. For settlement, the consumer's bank debits the consumer's account and is obligated to a net position with the payment network; likewise, the biller's bank receives a net position from the payment network and credits the biller's bank account. If the consumer's bank agrees to send non-reversible payment messages, the consumer's bank does not submit the transaction until funds are good unless the consumer's bank is willing to take the risk of loss if funds are not good, in the case of a guaranteed payment network.

24 Claims, 23 Drawing Sheets

OTHER PUBLICATIONS

R. Trigaux; Home Banking Reaches Critical Juncture; American Banker; Oct. 19, 1982 vol. 147/204.

Joan Prevete Hyman; Switch software to take on POS, home banking functions; Bank Systems & Equipment; Feb. 1983 pp. 68–70.

John A. Farnsworth; Home Banking—Part of a Bigger Picture; United States Banker; Jun. 1983.

Money Circulation System, Nikkei Data–Pro, KS3–210–203 (Money Circulation Network),item II, "Online Fund System among Main Banks", Oct. 1, 1989.

Electronic Banking, Money Circulation Data System Center, Oct. 31, 1986, pp. 35–41.

Chapter 10: Electronic Funds Transfer and the Intelligent Token; Security for Computer Networks: An Introduction to Data Security in Teleprocessing and Electronic Funds Transfer; D.W. Davies and W.L. Price; John Wiley & Sons; 1984.

Verkoren, Hans, "Eurogiro: Transparency in Cross–Border Payments," Eurogiro Network, Winter, 1995, pp. 28–30.

"Electronic Consumer Billing and Payment: Architecture" relating to the Electronic Consumer Invoice and Payment, project in TG6 WG3 of the Finance Sub–Committee of ASC X12.

"Consumer Bill Payment Services," relating to the Electronic Consumer Invoice and Payment, project in TC6 WG3 of the Finance Sub–Committee of ASC X12.

White, George C. Jr., "The Developing Electronic Giro Payment Environment," Bank Marketing, Apr., 1978, pp. 1–5.

Wells Fargo Bill Payment Service, "Pay Your Bills With A Touch Of A Button."

Michael P. Sullivan; The HBI Role in the Home Banking Revolution; United States Banker; pp. 46–48.

Home Banking Interchange; Revolving Credit Letter; May 27, 1983.

Home Banking Interchange Offers More Than Just Credits and Debits; American Banker; Jul. 6, 1983 vol. 148/130.

D. Tyson; Home Banking Interchange Is Going Through Final Tests; American Banker; Jun. 18, 1984 vol. 149/120.

Robert M. Garsson; NBD Offers Electronic Highway for Network of Shared ATMs; American Banker; Apr. 11, 1984.

David Jones; US Banks Experiment With Home Banking; The Banker; Jan. 1984 pp. 61–67.

Electronic Home Banking Lets Customers Pay Bills Around the Clock; Bank Administration; Apr. 1984.

A. Joseph Newman, Jr.; 8 Banks and Thrifts in 3 States Launch Video Banking Service; American Banking,; Jun. 9, 1987 pp. 2 vol. 152/111.

Maria Osborn Howard; Crestar to test at–home banking; Richmond Times–Dispatch; Feb. 26, 1994 p. C1 and C6.

Lisa Fickenscher; Online Resources' Home Banking Patent Hits Hot Buttons Throughout Industry; American Banker; Feb. 17, 1994.

Patrick T. King; A Novel Television Add–On Data Communication System; Journal of the SMPTE, vol. 83; Jan. 1974 pp. 10–13.

Steve A. Money; OEEFAX/ORACLE reception techniques, Part 1; Television; Jul. 1975 pp. 396–398 vol. 25.

Tekla S. Perry; Electronic banking goes to market; IEEE Spectrum; Feb. 1988 pp. 46–49 vol. IEEE.

Next in banking: pay bills by phone; Business Week; Nov. 13, 1965.

Allan H. Anderson et al. (8 more authors);An Electronic Cash and Credit System;;1966 pp. pp. 19–87 vol. Lib/Congress 66–27016 American Management Association, Inc..

Money goes electronic in the 1970s Special Report; Business Week; Jan. 13, 1968 pp. pp. 54–76.

Edward J. Hogan; EFT Technology—Present and Future; Prepared statement to be delivered before the National Commission on Electronic Fund Transfers; Dec. 16, 1976 pp. 148–205.

EFT Technology—Present and Future; Transcript of National Commission On Electronic Fund Transfers Suppliers Committee Public Hearings; Dec. 16, 1976.

D. Tyson; Home Banking: Programs In Operation In 1984 and Planned; American Banker; May 14, 1984 pp. 22–23 vol. 149/95.

Base I: A Real–Time System For Interchange Authorization; 1973 vol. Visa USA Inc..

Base II: An Electronic System for Worldwide Interchange; 1976 vol. Visa International.

George C. White; Have you heard? "Check and list" is obsolete for receiving consumer bill payments; Journal of Cash Management; Sep./Oct. 1990 pp. 52–3.

Chris Shipley; With CheckFree, PCs pay bills, so . . . "I threw away my checkbook"; PC Computing; Nov. 1990 vol. Ziff–Davis Publishing Company.

Paul J. Mila; Home Banking/Bill Paying Still Has Not "Taken Off";; vol. Online Resources.

Presented by Dennis J. Pope, Manufacturers Hanover Trust, New York, NY;;.

Vicki J. Hall; Home Banking in the '90s: Successful Business Strategies; Submitted in partial fulfillment of the requirements of the Pacific Coast Banking School conducted at the University of Washington, Seattle; Apr. 1990 pp. 1–90.

Electronic Fund Transfers (EFT) and the Public Interest; a report of the National Commission on Electronic Fund Transfers, Feb. 1977, PB 272–575; U.S. Department of Commerce, Washington, D.C.

EFT in United States; Policy Recommendations and the Public Interest; The Final Report of the National Commission on Electronic Fund Transfers; Oct. 28, 1977.

| BRN | BID | CBMASK | BILLER TEXT | ... |
|---|---|---|---|---|
| 918-272-642 | 493217 | ##^AA^#C | SOME COMPANY, P.O. BOX... | ... |
| ... | ... | ... | ... | ... |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |

ELECTRONIC BILL PAY SYSTEM

CROSS REFERENCE TO RELATED APPLICATIONS

This application is a continuation-in-part of application Ser. No. 08/552,586, filed Nov. 3, 1995 which is a continuation of application Ser. No. 08/146,515, entitled "ELECTRONIC BILL PAY SYSTEM", filed Nov. 1, 1993 and issued as U.S. Pat. No. 5,465,206 on Nov. 7, 1995. Those applications are incorporated herein by reference for all purposes.

BACKGROUND OF THE INVENTION

The present invention relates to the field of electronic bill payment systems ("bill pay"). A bill pay system allows a consumer or business to direct their bank, an agent of their bank, or a non-bank bill pay service bureau, to pay amounts owed to merchants, service providers and other billers who bill consumers or businesses for amounts owed, and allows a consumer or business to receive electronic invoices.

Millions of consumers make payments to utilities, merchants and service providers ("billers") by check, with a small number of consumers using non-check means for paying billers. The term "consumer" as used herein broadly refers to any person or entity paying a bill, be it a utility customer, a taxpayer paying a tax, a borrower repaying a loan, etc., which could be a person, governmental or business entity. Consumers are differentiated from "customers" herein because that term could potentially refer to many parties to a bill pay system, in that the biller is a customer of its bank (the "biller bank"), the consumer is a customer of its bank (the "consumer bank"), and consumer might be a customer of a non-bank bill pay service bureau. The consumer is also usually a customer of the biller. To avoid confusion, the bill paying entity is referred to as the "consumer" and the biller' is the entity which is to be paid.

Billers, who often are billing small amounts with each transaction, must incur the costs of processing many checks, including the attendant overhead of dealing with remittance processing, such as opening envelopes, data capture of the consumer's account number, MICR (Magnetic Ink Character Recognition) encoding of the check amounts, etc. To ensure that the cost of processing an item is small, billers have set up huge operations for remittance processing, often out-sourcing the work to "lockbox" operations which process and deposit the payments for the biller, supplying the biller with captured consumer data and MICR encoded checks for deposit. The payment coupons which a biller requests to be returned with the consumer's check are often preprinted with scanlines comprising lines of data (account number, amount due, etc.) which can be electronically captured due to the design and placement of the scanlines on the coupon. For example, the necessary information may be provided on the coupon in a bar code, or other mechanically or electronically readable form. Because of this, coupons play a key role in today's remittance processing systems.

Given the economies of scale, a biller has great incentive to reduce the cost of remittance processing and, more significantly, the biller has an even larger incentive to reduce the cost of "exception items." An exception item is a payment which, for some reason, cannot be processed according to the highly automated and/or standardized procedures put in place by the biller to quickly process remittances. Exception items include checks received without payment coupons, payment coupons received without checks, checks for amounts different than the amounts shown on the corresponding coupons, multiple payment coupons received in an envelope with a single check. The cost to process a typical payment transaction is $0.09 to $0.18 per transaction for a high-volume, efficient remittance processing operation, while an exception item transaction might cost as much as $0.65 to $1.50.

Curiously, when a consumer decides to try an alternate form of remittance such as using a bill pay service bureau, either a bank or non-bank service bureau, the cost to the biller increases dramatically, because such a remittance is typically an exception item to most billers today. A bill pay service bureau provides a bill pay service to the consumer whereby the consumer directs the service bureau to make payments to the biller. Since the payment origination is usually done electronically, the remittance is not presented to the biller in the usual way, which is just a check and a payment coupon, in the biller-provided envelope. Instead, the biller usually receives a check printed by the service bureau drawn on the consumer's bank account and showing the consumer's account number with the biller and MICR data encoding the consumer's bank account number. In some cases, the service bureau obtains the funds from the consumer, and then presents the biller with a check drawn on the service bureau's account with instructions to credit the amount of the check to the consumer's account with the biller. In other cases, the payment is an electronic transfer where the consumer's account information is included with the transfer or provided in a list of payments from multiple consumers provided by the service bureau to the biller.

In any case, these transactions are exception items to the biller, since no payment coupon is presented, and thus entail additional costs to billers. Unfortunately for the billers, electronic payments and the use of service bureaus will increase in popularity, causing the percentage of exception items to increase, unless a "non-exception" mechanism for efficiently handling electronic payments without payment coupons is used. The costs to the consumer's bank, if it is not the bill pay service provider, or if it is not in cooperation with the service bureau, increase also, since it must modify its check presentment and clearing process to accommodate these unusual transactions which are being forced upon the bank.

With large bill pay service bureaus, which may have many customers of their service paying bills to the same biller, that biller will often receive one check for many customers accompanied by a list of account numbers and amounts for the consumers whose remittances are part of the single check. The biller then must go through the list manually to verify that the account numbers are correct, and then capture the data to their accounting systems. Thus, if more and more consumers start using this alternative payment means, the percentage of remittances which are exceptions will go up, raising the average cost per transaction.

Many proposed bill pay systems are designed with little or no consideration of the costs to parties other than the consumer and the bill pay system operator. For example, U.S. Pat. No. 5,220,501, issued to Lawlor, et al., describes in detail a bill pay system in which the bill pay system operator captures consumer payment directives using a telephone with a small text display. These consumer payment directives are sent to a central computer operated by the system, which then uses an ATM network to obtain funds in the amount of the payment from the consumer's ATM-accessible bank account. Once the funds are obtained into an account of the system operator, the system determines how to pay the biller, either by wire transfer, debit network using the biller's bank account number, or by check and list. While the Lawlor et al. system is presented as being very beneficial to the system operator (i.e., the service provider of bill pay services to the consumer), it has less than desirable effects on the consumers, the consumers' banks, and the billers.

With the Lawlor et al system, consumers run the risk of loss if the system operator were to go out of business between the time a withdrawal is made and the payment is made to the biller. The consumers also cannot pay a bill to a one-time vendor easily, since the system is only set up to pay billers which the consumer has previously identified days or weeks before a payment to a biller is ordered. There are two reasons for this. First, the Lawlor et al. device for consumer data entry is geared to users who require simple devices and because a keyboard for entry of biller data to enroll a biller would be too complicated. Instead, the consumers submit forms to the system operator identifying the biller, probably by name and address. This identification is inexact, because the system operator might identify the wrong biller, and billers might operate under similar names with similar addresses.

Billers dislike systems such as Lawlor's because each transaction through the system is an exception item to the billers, and if a service bureau makes a mistake, the biller will often find itself fielding the call from consumers when they call to complain about misapplied payments. Billers could try to add a service charge to cover the added expense, in much the same way that mail-order companies charge less for prepayment and retail outlets charge less for using cash, but the problem is that the billers do not know which remittances will come in normally and which remittances will come in via a bill pay service. What is needed is a simple means of shifting the costs of the exception items to the consumers, or lowering the costs of the transactions. That way, if the consumer insists on being an exception item, the biller can recover their costs, and the interests of both the consumer and biller are served.

Several other solutions to the high cost of exception items have been proposed, such as billers getting pre-authorization from consumers to submit debit requests to consumer's bank, or a service which specializes in processing exception items into a form processable by the biller's automated remittance processing system or lockbox. These, however, have not been satisfactory solutions. The former solution provides very little control by the consumer over the withdrawal of funds from its bank account and is only really useful for recurring payments from a particular consumer to a particular biller, while the latter adds an additional cost (albeit usually less than the exception processing costs) over and above the normal remittance processing cost. In some cases, for small recurring payments, the only way a biller's goods or services is offered to a consumer is through pre-authorized debits.

Several bill pay or remittance processing systems proposed in the prior art are described below, but first some background on bill pay is provided. For brevity and clarity, the consumer's account with the biller is referred to herein as the C-B ("consumer-biller") account, thereby distinguishing that account from other accounts: the consumer's account with its bank, the biller's account with its bank, etc. In most cases, the biller uses the C-B account number to uniquely identify the consumer in its records.

Bill pay transactions, however accomplished, have several common elements, which are either explicit or can be implied by the nature of the transaction. The first is presentment: a biller presents the consumer with a bill showing the C-B account number and an amount due. The second common element is payment authorization: the consumer performs some act (e.g., signs a check or other negotiable instrument) which authorizes the consumer's bank to transfer funds from the consumer's account to the biller; this element might occur after presentment or before (as in the case of pre-authorized withdrawals), and need not be explicit (delivery of a check is implicit authorization for the amount of the check). This element is almost always accompanied by some action by the consumer bank to ensure payment to it from the consumer, such as withdrawing the funds from consumer's bank account, posting the amount to the consumer's credit card account or line of credit, etc. The third common element is confirmation to the consumer of the funds withdrawal. The fourth common element is the crediting of the payment to the C-B account. In some cases, the biller acknowledges the crediting with nothing more than refraining from sending a past due bill.

FIGS. 1–3 show block diagrams of existing bill pay systems which implement these four common elements in different ways. In those block diagrams, the participants are shown in ovals, and the flow of material is shown by numbered arrows roughly indicating the chronological order in which the flows normally occur. The arrows embody a link, which is a physical link for paper flow, a data communications channel from one point to another, or other means for transferring material. Where several alternatives exist for a flow, the alternatives might be shown with a common number and a letter appended thereto, such as "2" and "2A". "Material" refers to documents and/or information, whether paper-based ("postal mail"), electronic (e-mail, messages, packets, etc.), or other transfer medium. In most cases, the material which is flowing is shown near the arrow which links the material's source and destination.

FIG. 1 is a block diagram of a conventional paper bill pay system 10, wherein billers send paper bills or coupon books to consumers and consumers return paper checks and payment coupons. Because the majority of today's bill pay transactions occur this way, the proof and capture process for these remittances is highly automated, except for the aptly-named "exception items."

In bill pay system 10, the participants are a consumer C (12), a biller B (14), consumer C's bank (Bank C) 16, biller B's bank (Bank B) 18 and, optionally, a lockbox operator 20. Bank C maintains consumer C's bank account 22 and a clearing account 24, while Bank B maintains biller B's bank account 26 and a clearing account 28. The material passing between the participants includes a bill 30, a remittance 32 comprising a check 34 and a payment coupon 36, an account statement 38, an accounts receivable ("A/R") data file 40, an encoded check, which is check 34 with MICR encoding, and possibly a non-sufficient funds ("NSF") notice 46.

The flow of material between participants in bill pay system 10 begins (arrow 1) when biller B sends bill 30 through the postal mails to consumer C. Bill 30 indicates a C-B account number and an amount due, and is typically divided into an invoice portion to be retained by consumer C and a payment coupon portion to be returned, each of which shows the C-B account number and amount due.

In response to receiving bill 30, consumer C sends remittance 32 to biller B (arrow 2). Remittance 32 contains check 34 drawn on consumer C's account 22 at Bank C and payment coupon 36, preferably included in the return envelope provided by biller B. Biller B then MICR encodes the amount of the remittance onto check 34 to create encoded check 44, and deposits check 44 (arrow 3), and credits consumer C's account in biller B's customer general ledger ("G/L") account database 42. Alternately, remittance 32 is mailed to lockbox operator 20 (arrow 2A), which opens remittance 32, MICR encodes check 34 to create encoded check 44, captures the C-B account number and amount of the check electronically to create A/R data file 40. Lockbox operator 20 then sends A/R data file 40 to biller B, and sends encoded check 44 to Bank B to be credited to biller B's account 26 (arrow 3A). Because check 44 is signed by consumer C, it authorizes Bank C to pass the amount of the check to Bank B after Bank B presents the check to Bank C. The signed check serves as the second common element of a bill pay transaction: authorization.

However encoded check 44 reaches Bank B, Bank B then presents check 44 to Bank C, along with other checks received by Bank B which were drawn on Bank C accounts (arrow 4). When Bank C receives check 44, it withdraws the amount of the check from C's account 22 and passes the funds to B's account at Bank B (arrow 5). Actually, this funds transfer occurs from C's account 22 to clearing account 24, to clearing account 28, and then to B's account 26, possibly with one or more intermediate settlement banks in the chain (omitted for clarity).

If the funds are not available in C's account 22 to cover the amount of check 44 or if C's account 22 has been closed, then Bank C will return the check to Bank B, who will in turn return the check to biller B. Biller B will then have to reverse the transaction crediting consumer C's C-B account in G/L database 42 and renegotiate payment from consumer C, all at significant cost to biller B. Even if check 44 clears, the process of providing good funds to biller B is not instantaneous, since check 44 must physically travel from biller B to Bank B to Bank C. Of course, if biller B has sufficient credit rating with Bank B, Bank B could move the funds from clearing account 28 to B's account 26 when Bank B receives check 44.

At some time following the clearing of check 44, biller B also updates its A/R records in G/L database 42 to credit consumer C's C-B account, and Bank C confirms to consumer C the withdrawal of the amount of check 44 by listing it on statement 38 and/or by the return of canceled check 44. If the check doesn't clear, then biller B and other parties to the transaction unwind the payment.

One benefit of bill pay system 10 is that, for nearly all billers, there is no need for biller enrollment (any consumer can pay a biller without prior arrangements or a waiting period). However, many drawbacks of bill pay system 10 are apparent. Consumer C must individually address, mail and track payments to individual billers such as biller B. Bill pay system 10 must reach arrow 5 before funds availability is confirmed. If the funds cannot be confirmed, the progress of the transaction must be reversed, with costs to Bank C, Bank B and biller B. In such a system, consumer C does not have control over when the funds are transferred, because the transfer timing depends on when biller B receives and processes remittance 32 and when Bank B receives check 44 from biller B.

A variation on the above system is the GIRO systems used in several countries in Northern Europe. The GIRO systems were set up there either by the government or the postal system, which is a traditional supplier of financial services. In a GIRO system, it is mandated that each bill payer and each bill payee be assigned a GIRO number. The biller sends bills with its biller GIRO number on the payment coupons. The layout, shape, etc. of the GIRO payment coupons is also mandated, so a consumer will receive similar coupons with each bill. After reviewing the bill, the consumer simply adds their GIRO number to the payment coupon and signs it. Thus, the payment coupon also serves as a banking instrument similar to a check.

The consumers in a GIRO system are comfortable with it because the payment coupons all look the same. The consumer then mails the payment coupons to either a GIRO central processor or its own bank, which then sorts them by biller GIRO number and submits them to the biller. Since the payment coupons are all in a fixed format, they can be easily encoded in a machine readable format, including the payment amount, which the biller pre-prints onto the coupon. If the consumer gives their GIRO number to the biller, the biller can also pre-print that number on the payment coupon as well. Since all the coupons look the same, the banks can process them like a check and achieve economies of scale.

While a GIRO system might be a partial solution to efficient remittance processing, it does not go far enough. Furthermore, in the U.S., it is not suitable, since there are many more billers in the U.S. to coordinate compared with the relatively few billers in Northern Europe which would need to be coordinated. Coordination of billers and getting them all to standardize on a fixed format for bills, even for a few billers is easier in those countries, since the governments there typically take a more active role in payment systems. Also, consumers in the U.S. are less likely to need such a system, because checking accounts are more readily available to consumers in the U.S.

As for the billers, they still have the problems of bill pay system 10, albeit with less of a problem with missing checks or coupons, because the check is the coupon. The biller still must contend with the paper shuffling, checks that do not clear, etc. Also, because the system is funded by float on the funds, there is less of a concern among the parties involved in bill pay to try and balance their costs with other parties. In the U.S., however, one day's float may be an unacceptable cost to the participants in the bill pay system, and it does not allow for competitive rates. A consumer's bank or a biller's bank has no incentive to be more efficient so that it can charge less than another bank and thus compete for a larger market share, since banks do not charge for the GIRO services and have no power to reduce the costs to the participants, nor shift them to the best cost absorber.

FIG. 2 is a block diagram of an alternate bill pay system 50, which reduces the effort required on the part of consumer C relative to bill pay system 10, but which increases costs for billers. The difference between bill pay system 50 and bill pay system 10 is that consumer C initiates payment electronically (or by other non-check means).

Bill pay system 50 includes most of the same participants as bill pay system 10: consumer C, Bank C, Bank B, possibly a lockbox operator (not shown in FIG. 2), and biller B, who is typically not a proactive or willing participant in this system. Additionally, a service bureau S (52) and a Bank S (53) are participants, with service bureau S maintaining a service database 54 which is used to match bill payment orders with billers. The material passing among the participants includes bill 30, as in the prior example, as well as a bill payment order 56 and related confirmation of receipt 66 (both typically transmitted electronically), an enrollment package 57, a biller confirmation 58, a bill payment 60 ("check and list") which includes check 62.

In bill pay system 50, consumer C typically enrolls in bill pay system 50 by sending service bureau S (arrow 1) enrollment package 57 comprising a voided check and list of billers to be paid by S on behalf of C. S subsequently sends biller B biller confirmation 58 (arrow 2) to verify (arrow 3)

that C is indeed a customer of B and/or that biller B is a valid biller and/or to confirm/elicit accurate payment routing information. The fundamental features common to all bill pay enrollment processes involve consumer C identifying the billers to be paid by S, the consumer C's C-B account number(s) with each biller to be paid, and the funding account(s) at bank(s) C to be used to fund payments.

With bill pay system 10 (FIG. 1), consumer C identifies the proper biller by the remittance envelope and the payment coupon, neither of which is available to service bureau S in bill pay system 50. Thus, service bureau S must identify the correct biller for each bill payment order some other way. Typically, service bureau S does this by asking consumer C for biller B's name, address, telephone number and consumer C's account number with biller B ("C-B account number"). Since neither Bank C nor service bureau S may have any account relationship with biller B, they must rely upon consumer C's accuracy in preparing enrollment package 57 which is used to put biller B's information into service database 54. Service bureau S typically requires this information only once, during biller enrollment, storing it to service database 54 for use with subsequent payments directed to the same billers. Of course, if this information changes, service database 54 would be out of date. If this information is wrong to start with, or becomes wrong after a change, service bureau S might send funds to the wrong entity, to the wrong location at the correct entity, or to the wrong C-B account at the correct biller entity. What a service bureau will often do to reduce errors in biller identification is to not allow the consumer to make payments to a biller for a specified time period after enrolling the biller, to allow service bureau S to verify biller B and the C-B account mask with biller B in a biller confirmation message 58.

Sometime later, consumer C receives bill 30 (arrow 4) and initiates bill payment order 56 (arrow 5). Bill payment order 56 includes authorization for service bureau S to withdraw funds from C's account 22 to pay bill 30, the amount to pay (not necessarily the amount due on bill 30), the date on which to pay, and some indication of biller B as the payee. Service bureau S responds with confirmation of receipt 66 indicating that bill pay order 56 was received (arrow 6). Consumer C can send bill pay order 56 in any number of ways, such as using a personal computer and modem, directly or through a packet of other data network, via an automatic teller machine (ATM), video touch screen, a screen phone, or telephone Touch-Tone™ pad (TTP) interacting with a voice response unit (VRU). However this is done, service bureau S receives one or more bill pay orders from consumer C. These orders could be instructions to pay some amount for a bill or a set amount of money at periodic intervals.

Assuming that service bureau S has correctly identified and confirmed that biller B is a biller which consumer C desired to pay with bill pay order 56, then service bureau S passes the funds to biller B as biller payment 60 (arrow 12) after securing funds to cover the remittance. Bill payment can take several forms as discussed below. In FIG. 2 a "check and list" is depicted, which is common in the art. A check and list comprises a single payment, check 62 drawn on service bureau S's account 70, accompanied by a list of all consumers whose individual remittances are aggregated in the single check. The list shows C-B account numbers and payment amounts for each consumer included on the list which should total to the amount of the single check 62. This process brings some economies of scale to service bureau S, although at additional expense to biller B. In some cases, rather than endure the expense of checking over the list to ensure it matches the check amount, biller B will refuse to accept that form of payment.

To secure funds, service bureau S either prints a check (check 44) drawn on C's account to biller B (arrow 7) or debits C's account at Bank C using an ACH debit (arrow 10) and then sends payment 60 to biller B (arrow 12). Either way, biller B must treat payment 60 as an exception item, since check presentment is done without including the payment coupons, and in the case of check and list, posting to G/L database 42 is done from the list instead of from payment coupons as in bill pay system 10. Biller B deposits check 62 with Bank B (arrow 13) who clears it through Bank S and a settlement account 71 (arrow 145) (if the check is drawn on S's account) or (arrow 20) through Bank C (for example, if check 44 drawn on C's account) to obtain good funds for B's account 26 (arrows 14–17). The cycle is completed (arrow 18) when consumer C receives notice that funds were withdrawn from C's account 22, either through check 44 or through ACH debit (arrow 10), for the amount entered in bill pay order 56.

If the bill pay transaction goes through, Bank C will confirm that it went through by sending a confirmation (typically statement 38) to consumer C. However, the transaction might have to be sent back for a number of reasons. If the service bureau S cannot identify biller B from information provided by consumer C, it will reverse the transaction. If biller B is misidentified, or the C-B account number provided by service bureau S is not valid, the transaction will be reversed after arrow 12, at considerable confusion to consumer C and service bureau S, and cost to biller B. In some cases, biller B will not make the effort to reverse the transaction, instead holding onto the funds until consumer C asks for them back. Furthermore, if the funds are not good, additional costs are imposed on biller B, and the possibility exists that consumer C will lose money if the funds pass through service bureau S, and S subsequently goes out of business before transferring the funds to biller B.

Bill pay system 50 has further drawbacks. For example, authorization for withdrawals from C's account 22 are made by C either at time of payment or in advance, for future payments. To allow time for service bureau S to process requests, they will often require a window of several days in which they agree to process the payment. Because of this, consumer C is asked to leave good funds in account 22 for the duration of this period.

Another problem with bill pay system 50 is that service bureau S must figure out which payment method to use with which billers. The check and list approach might not be workable with biller B, either because biller B refuses to be burdened with it or for other reasons. The bill payment process just described is essentially a series of bilateral agreements between a party and usually, although not always, the next party in the payment process, with no agreements from end to end, so there is no guarantee that any arrangement between two parties such as service bureau S and biller B will be effective at reliably and inexpensively transferring funds from the consumer to the biller. For example, consumer C might have an agreement with service bureau S, but service bureau S and Bank C might still be strangers to each other. Service bureau S and Bank C are generally always strangers to biller B, which is why there needs to be so many different paths to biller B.

Consumer C in bill pay system 50 must also contend with one confirmation from service bureau S that payment was sent, a different confirmation from Bank C indicating that the transaction was completed, and possibly a third confirmation from biller B confirming that biller B credited consumer C's account in G/L database 42. Consumer C is also less in control of account 22. Since service bureau S maintains only the payment information and recurring payment information and Bank C does not have that information, consumer C cannot look to one entity to provide a complete statement of the status of the account which was the source of the funds, since service bureau S has some of the information and Bank C has the rest.

Several variations of the system shown in FIG. 2 are used today. In one variation, S sends an individual check 44 (unsigned-signature on file) drawn on C's account 22 to biller B in response to bill pay order 56. This clears as in bill pay system 10 (FIG. 1, arrows 3–7), but B must process these one at a time, since they are exception items. This reduces the possibility that B will refuse to process check 44, since it only differs from the expected payment form by lacking a coupon. Thus, biller B is less likely to refuse this form of payment over a check and list, and the biller is less likely to have problems of the list not balancing or having bad account numbers.

In a second variation, instead of a check from Bank C cleared through Bank S to credit S's account 70, S has Bank S submit a debit to C's account 22 through the Automated Clearing House ("ACH") (see FIG. 3 and accompanying text). In a third variation, in place of arrows 12–17, ("check and list"), S may send A/R data and a credit to biller B through one path of: i) Bank S to ACH to Bank B to biller B or ii) MasterCard's RPS (Remittance Processing System) to Bank B to biller B. As used here, the RPS is merely an alternative to the ACH. Alternatively, S may send the A/R data via a separate electronic data interchange to biller B and forward the payment amount via the ACH or RPS mechanisms. In a fourth variation, a combination of the second and third variations, S sends simultaneous ACH transactions (debit account 22 and credit account 26).

FIG. 3 is a block diagram of yet another bill pay system 80, which is usually used with billers who expect regular, periodic payments. Relative to the previously discussed bill payment systems, billers generally prefer bill pay system 80 when they are set up to handle such transactions.

Bill pay system 80, while providing more efficient remittance processing by biller B due to its increased control over the process, leaves consumer C with very little control over the bill pay transactions after the relationship is set up, since consumer C is typically required to give biller B an open ended authorization to withdraw funds. Furthermore, bill pay system 80 is not appropriate for all types of billers, such as those who do not have an on-going and predictable relationship with consumers.

FIG. 3 introduces several new items which flow among the participants including ACH 81, such as a voided check 84, a debit advice 86, a pre-authorization message 88, and a debit request message 90. In bill pay system 80, biller B is required to maintain an additional customer database 82.

For bill pay system 80 to work properly, there is an enrollment phase (arrows 1–4) and an operational phase (arrows 5–13). In the enrollment phase, consumer C gives biller B voided check 84, which biller B uses to initiate pre-authorization message 88. Biller B is not allowed by ACH 81 to directly submit pre-authorization message 88, which means Bank B, an ACH Originating Depository Financial Institution (ODFI), must get involved and submit message 88 to Bank C, an ACH Receiving Depository Financial Institution (RDFI). After pre-authorization message 88 is accepted by Bank C, Bank C will accept Bank B initiated automatic debits to be posted to C's account 22. In the operational phase, biller B queries customer database 82 to determine if consumer C is enrolled as an automatic debitor. If so, biller B optionally sends debit advice 86 to consumer C, and sends debit request message 90 to biller B's bank, Bank B, which then sends it through the ACH 81 to Bank C, which debits C's account 22 and transfers the funds to biller B's account 26 via the ACH. The transaction is confirmed to consumer C on bank statement 38 sent to consumer C from Bank C. In this system 80, debit request message 90 might be rejected by Bank C for, among other reasons, non-sufficient funds, resulting in the flows along arrows 10–12.

Bill pay system 80 suffers from a lack of consumer control. Even if biller B fails to send debit advice 86 to consumer C, or initiates a debit request 90 for a different amount than contained in debit advice 86, it is up to C to unwind the transaction and bear the consequences of biller B's error(s). C's account 22 will get debited, and C has little or no control over the transaction date. Furthermore, if C has a dispute with biller B, it may be very difficult, short of closing account 22, to prevent biller B from taking a disputed amount from C's account 22.

While some billers may prefer bill pay system 80 over bill pay system 50 (FIG. 2), it nonetheless entails costs that exceed highly automated bill pay system 10 (FIG. 1), because biller B must enroll each of its customers using the system and maintain a separate customer database 82 for authorizations, debit amounts and debit period. This system also requires an extended enrollment period.

Enrollment is not really necessary in bill pay system 10 (FIG. 1), but is very much an issue in bill pay system 50 (FIG. 2) and bill pay system 80 (FIG. 3). In bill pay system 50, each consumer must undergo an enrollment process with their bill pay service provider. For a consumer to enroll, they must supply the bill pay service provider with a canceled check, which is used to set up the authorization to withdraw funds from account 22. Because the consumer is enrolled using a specific account, the consumer cannot easily change that account, much less direct that payments be covered by funds in various accounts for various payments. Instead, the consumer needs to keep the enrolled account open and must separately move the funds to cover bills to that account.

With bill pay system 50, the bill pay service provider must also enroll each biller to which a consumer requests payment if that biller has not already been enrolled by that service provider. To enroll a biller, a service provider must identify the means of payment for the biller, where the biller is located for mailing checks, etc.

With bill pay system 80, a consumer must enroll each biller separately, usually by sending a voided check to each, and the biller must enroll each consumer individually as well. In either system 50 or system 80, a consumer must wait several days or weeks until the consumer and the consumer's billers are fully enrolled.

Yet another disadvantage of conventional bill pay systems in which a biller has no control over the payment process, is that a biller may wish to reject a transaction for a number of reasons, such as that the transaction does not contain data required by the biller for proper processing or that the biller does not want to receive payments from a given customer.

None of the above-described bill pay systems can accommodate electronic invoice presentments. Most regular bills paid by consumers are bills presented by billers which are under regulatory control, either by utility regulators, bank regulators, or the like.

The above shortcomings demonstrate that an improved means of paying bills is needed.

SUMMARY OF THE INVENTION

An improved bill paying system is provided by virtue of the present invention. In one embodiment of a bill pay system according to the present invention, participating consumers pay bills to participating billers using a bill payment network (hereinafter "the payment network") where billers are universally identified and for which all participants agree to a set of protocols. The protocols include data exchange and messaging protocols as well as operating regulations which bind and direct the activities of the participants. The participating consumers receive bills from participating billers (paper/mail bills, e-mail notices, implied bills for automatic debts, etc.) which indicate an amount, and a unique biller reference number ("BRN") identifying the biller to the payment network. To authorize a remittance, the consumer transmits to its bank (a participating bank), or an agent of its bank or any other party connected to the network, a transaction indicating (1) an amount to pay, (2) the source of the funds, (3) a date on which to make the payment, (4) consumer C's account number with biller B (C-B account #), and (5) biller B's BRN. One or more of these elements might be represented by a pointer to relatively static information stored at Bank C. For example, if consumer C always uses one of a few accounts as the source of funds, consumer C could submit a pointer indicating which account. Pointers are also a useful way of specifying BRNs and C-B account numbers for frequently paid billers. A expansion of pointers to the pointed-to data can be done by Bank C maintaining look up tables for consumer C.

When Bank C receives the bill payment order from consumer C and expands any pointers as necessary, Bank C then submits an electronic transaction, a payment message, into a payment network directed to Bank B (biller's bank), a participating bank or an agent of the biller bank or any other participating party connected to the network and capable/authorized to receive said electronic transactions on behalf of biller B, which is determined from the BRN of the transaction. The payment network could be an existing network, such as the VisaNet® network, in which case a bank would connect their computer systems to computer systems at other banks through a VisaNet® Access Point (VAP) or equivalent device. Using an existing network would allow the start-up costs of such a bill pay system to leverage other traffic in the network, such as the bank card transactions occurring over the VisaNet® network.

The BRN is an unique number assigned by the operator of the payment network. For settlement, bank C debits the account designated by consumer C as the source of funds for that payment and is obligated to a net position with the payment network; likewise, bank B receives a net position from the payment network and credits biller B's bank account. Bank B's net position is equal and opposite to Bank C's net position except for a small processing fee, which is collected by the payment network from the transfer to finance the costs of operating the payment network. The net position could be equal to the payment message amount, or could be offset slightly to cover interchange fees, which are fees passed between consumer banks and biller banks in one direction or the other to balance the costs of interacting with the payment network with the revenues from payment network services provided, thereby easily balancing costs as appropriate, or processing fees which are fees used to fund the operating costs of the payment network.

The payment network can also handle foreign exchange. For example, Bank C can send out a payment message in a currency expected by Bank B, and receive a net position in the currency specified by Bank C, which may differ from the currency of Bank B, especially where Bank C and Bank B are in different countries. In other variations, Bank C sends the payment message to pay a bill in one currency, receives a net position in another currency, and takes funds from the consumer in a third currency.

Bank C does not submit the transaction until funds are good or Bank C is willing to take the risk of loss if funds are not good. Bank B, upon receipt of the transaction, releases the funds to biller B, and is assured that the payment network will credit Bank B with the funds from Bank C. The payment network might do this by issuing an order to move money from Bank C's settlement account to Bank B's settlement account at a settlement bank, which could be a commercial bank, the Federal Reserve bank in the case of Fed-Wire transactions, etc.

In an alternate embodiment, payment reversal messages are allowed to follow a payment message if sent within some period after the payment message, in which case Bank C might send payment messages without first securing funds. In specific embodiments, the consumer initiates the transactions manually, via paper, at an ATM, or via a PC, telephone keypad, screen telephone, or personal digital assistant ("PDA").

In an alternate embodiment which allows bidirectional message flow, messages can flow back to the consumer in addition to messages such as bill pay orders flowing from the consumer. To allow for proper routing of messages back to the consumer, each participating consumer is assigned a unique participant ID. With the ability to return messages to a consumer, additional services and processes can be provided by the bidirectional electronic bill payment system. Billers can specify certain data fields as being required and the bill payment system is programmed to return payment messages which contain insufficient data or incorrectly formatted data. Billers can also specify that, for legal reasons, they choose not to accept payments from specific consumers or payments made after certain dates. These biller requirements are stored in a database at a biller processor, which creates the return messages as needed. A customer service desk can also receive and review message traffic to provide preemptive customer service for returned messages.

An alternate embodiment of the invention permits "tailoring" of the services provided by the biller by modification of the UBF. The UBF contains fields or flags that indicate the ability or willingness of a biller to provide certain capabilities. For example, these capabilities might include, but are not limited to, the ability to support electronic invoice presentment, two way communication, test transactions, etc. In addition, service providers may not be able to support all biller capabilities. By modifying the UBF, the biller identifies those services which it can provide. The service provider can then determine whether it can or needs to support those services, without specific communication from the biller.

In another alternate embodiment of the invention, support is provided for processing commercial payments (business to business) in addition to consumer payments. Such commercial payments are often accomplished using electronic data interchange (EDI) formats. There are proposed invoice structures and templates, such as those described in ANSI X.12 and its subsequent releases. The system could also be used for government payments (G-Pay system). The UBF may be used to identify the processing requirements for the business that is to receive electronic payments, and may also be augmented with software and processing capabilities to support translation and reformatting capabilities such that the originator of a message or transaction could originate the item in its own format and the payment system using capabilities driven by the UBF (e.g., templates) could convert the item into the format required or desired by the intended recipient.

In addition to messages sent in response to a bill pay order, billers can use the payment network to present invoices to customers.

A further understanding of the nature and advantages of the inventions herein may be realized by reference to the remaining portions of the specification and the attached drawings.

BRIEF DESCRIPTION OF THE DRAWINGS

FIG. 5 is a diagram of the universal biller reference file shown in FIG. 4;

DESCRIPTION OF THE PREFERRED EMBODIMENTS

Figure 1:
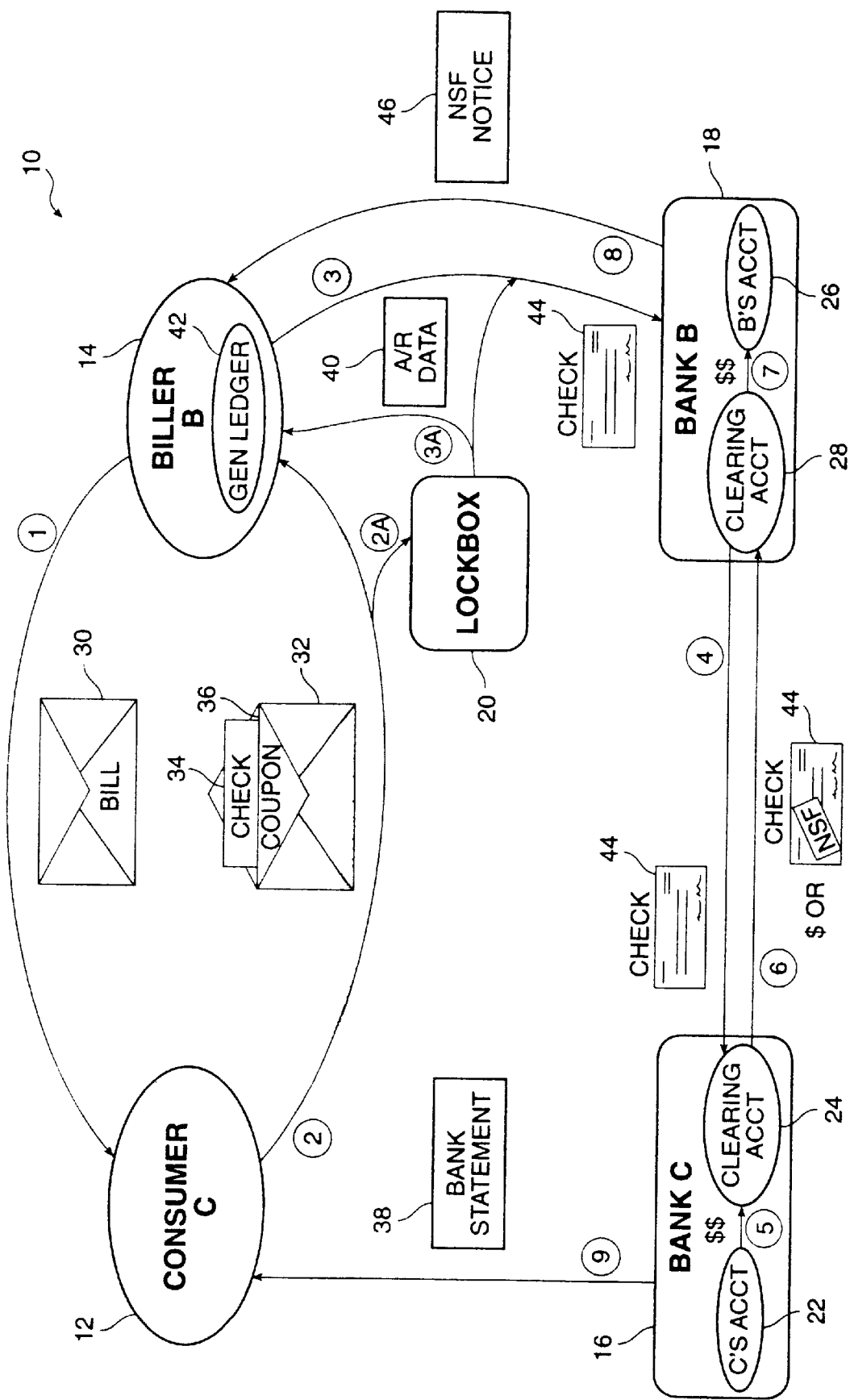
FIG. 1 is a block diagram of a bill pay system relying on postal mailed payments.
Figure 2:
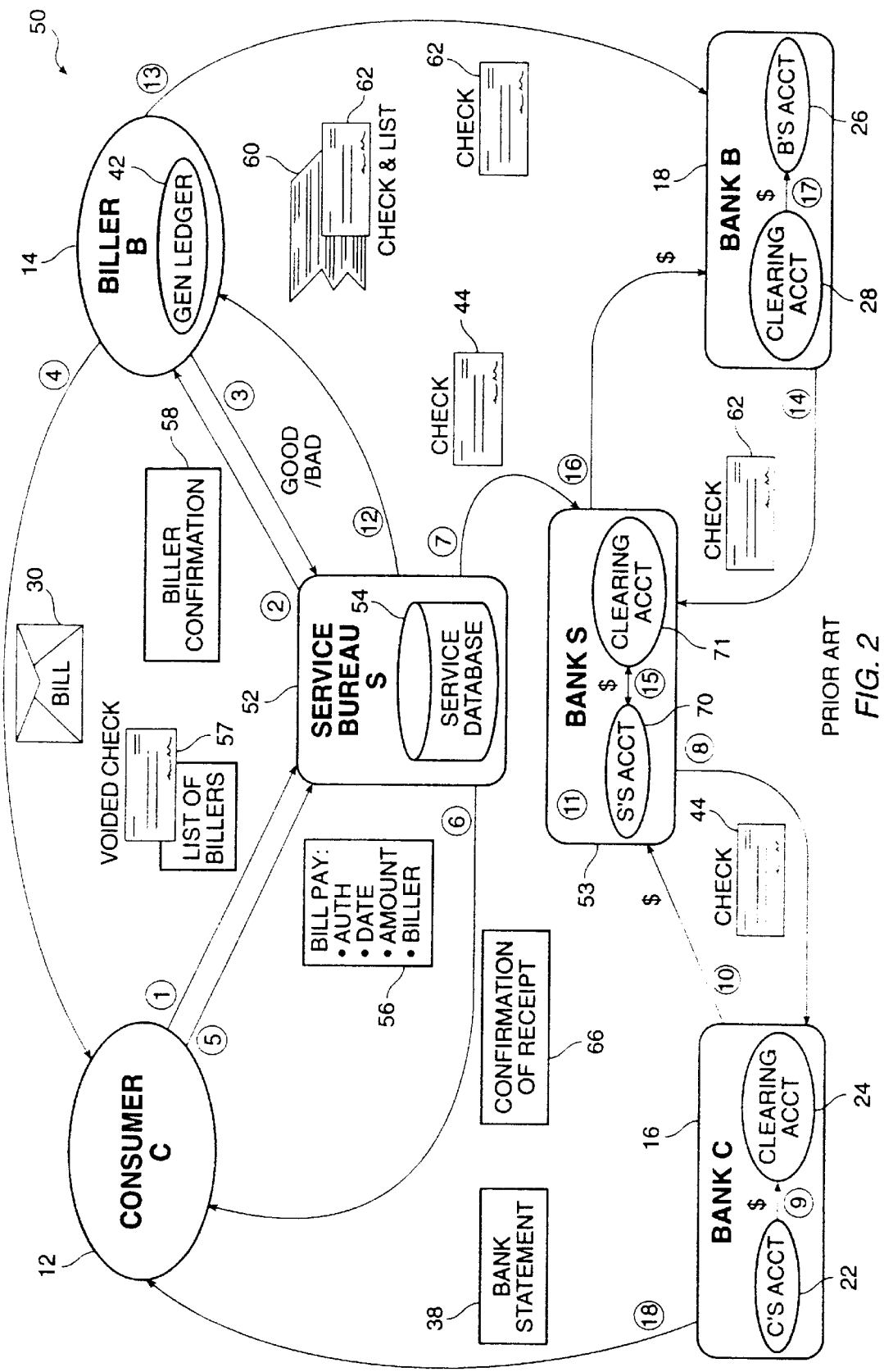
FIG. 2 is a block diagram of a bill pay system wherein consumers pay bills using a bill pay service bureau which has the consumers as customers.
Figure 3:
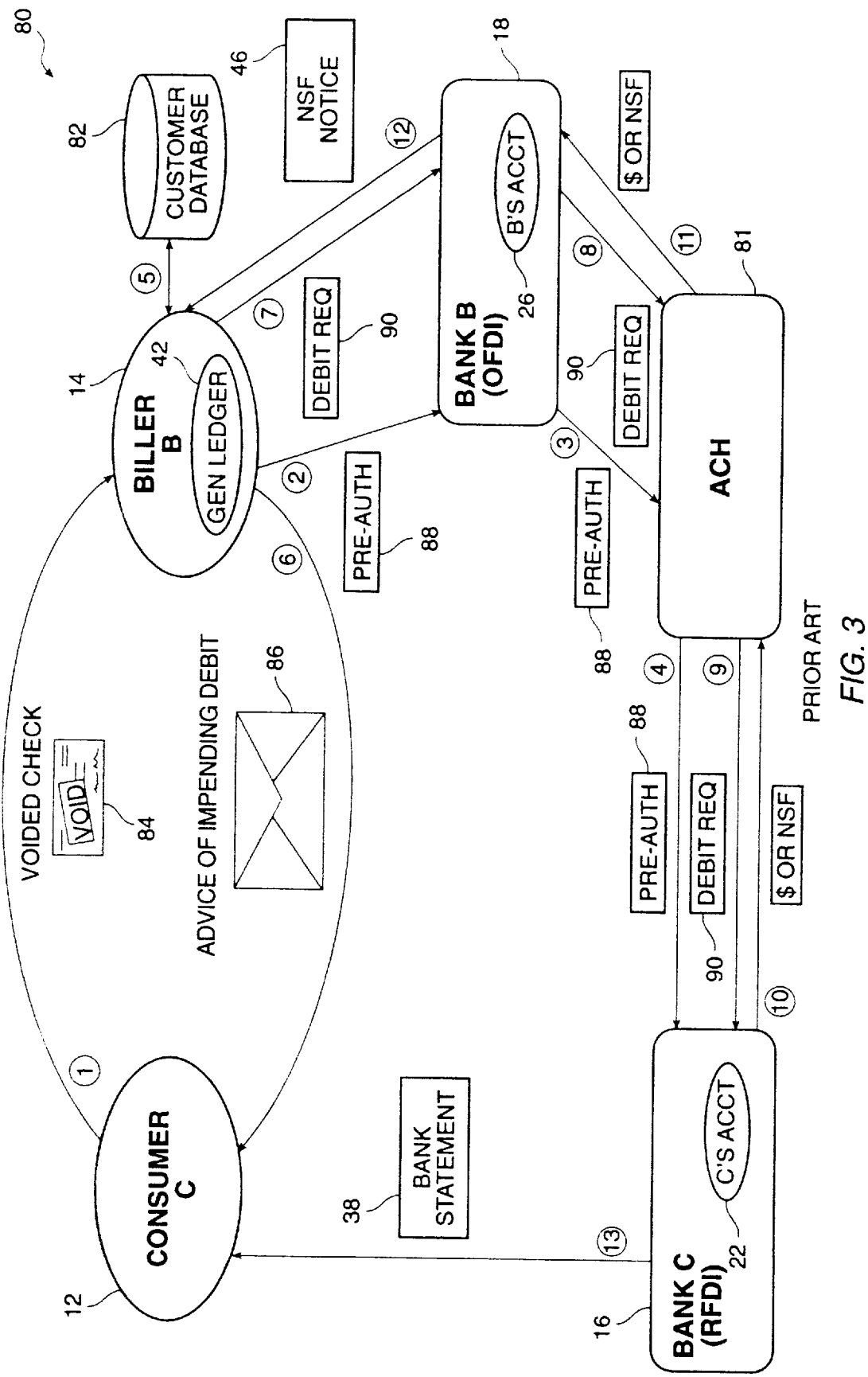
FIG. 3 is a block diagram of a bill pay system where billers initiate automatic debits to consumers' bank accounts.
Figure 4:
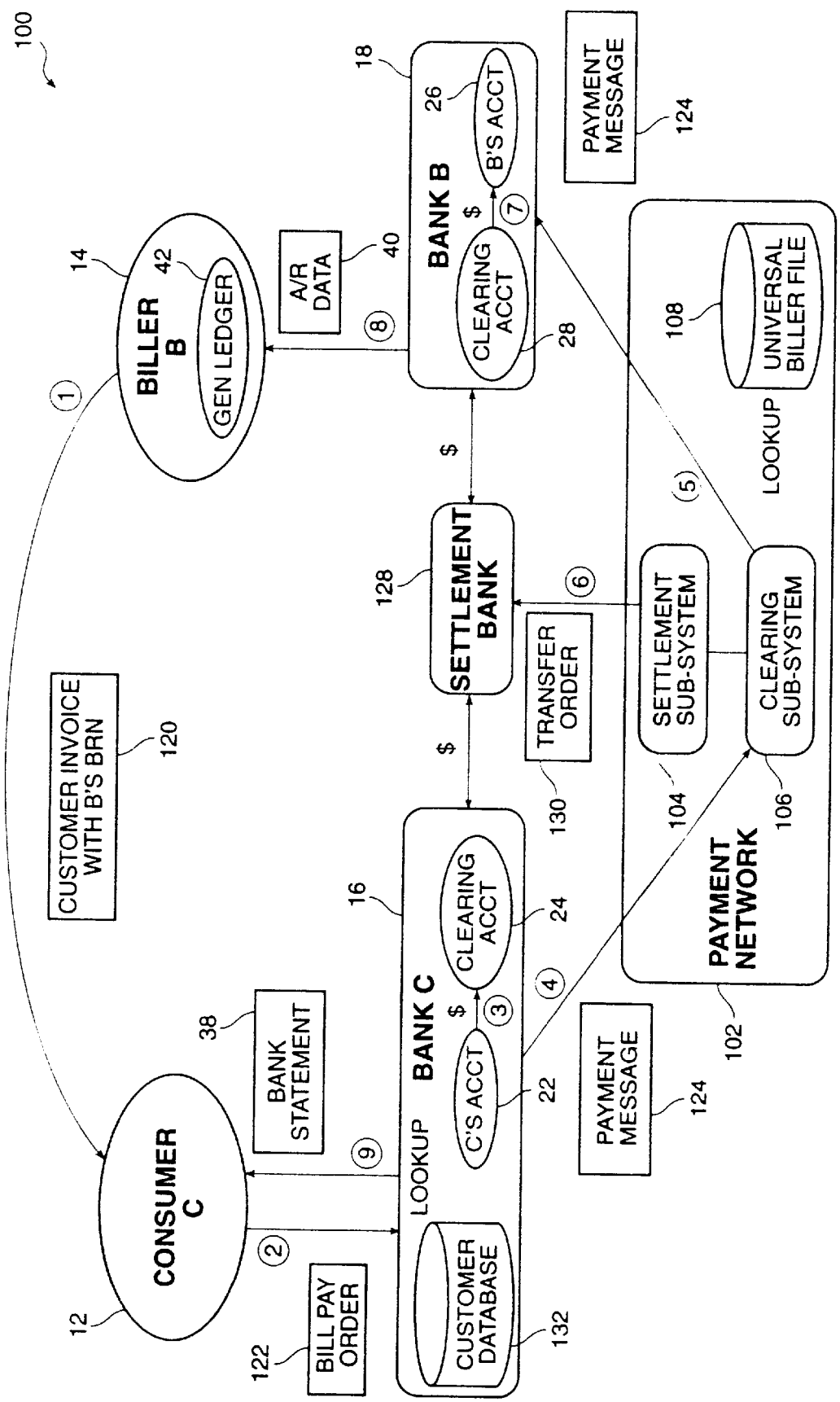
FIG. 4 is a block diagram of an embodiment of an electronic bill pay system according to the present invention, in which both sides of a bill pay transaction (consumer side and biller side) are coordinated through a payment network.

FIG. 4 is a block diagram of a bill pay system 100 in which consumers pay billers through a payment network which forms a backbone for funds clearing and settlement. System 100 is enabled in part by unique identifiers assigned by the payment network operator to each participating biller, and by the adherence of the participants to pre-agreed protocols. Consumers and billers participate in the bill pay system, but they need not deal with the many consumers or many billers directly. Instead, they need only deal with their bank, or other institution. For example, the invention can be implemented where banks or financial institutions only play a passive role as source and/or repositories of funds. The active role of initiating or receiving transactions on behalf of consumers and/or billers could be performed by non-banks. Such non-banks may include third party processors who may or may not market directly to consumers and/or billers, e.g. FDC, Intuit, Check-Free, etc.

In the system of FIG. 4, and in other figures of this patent application, the consumer bank and/or the biller bank can be replaced with a non-banking third party. For the following explanation, an example using a consumer bank and biller bank as the customer and biller interface is illustrated. Bill pay system 100 includes as participants consumer C (12), biller B (14), consumer's Bank C (16), biller's bank B (18), possibly other participants serving banks, consumers or billers, and a payment network 102. It should be understood that Bank C and Bank B, or any other participants occupying their roles, include some means of data and message processing, and that a reference to a bank is not only to the organization but also to the computer systems maintained by those organizations or agents of those organizations or other participants which operate the bank or bank-like component of the payment network. As an example of the use of the computer system for data and message processing, the data processing means of Bank C is used to keep a balance on C's account 22, clearing account 24, and other accounts maintained by Bank C, as well as to place holds on funds and in general to process information and instructions received from consumer C and other consumers. The message processing means of Bank C are used to connect the data processing means of Bank C to consumer C and to payment network 102 to allow the passage of materials therebetween. The message processing means of Bank C also might include a manual or automatic means of capturing data from postal mail sent to Bank C and means for generating outgoing postal mail. Where a description of a bill pay system refers to an action taken by a bank (Bank C or Bank B), it is implied that this action is performed by either the bank's data processing means, the bank's message processing means, or processing means of a third party contracting processing services to the bank, possibly also involving steps requiring human intervention (especially during consumer subscription to the service and where consumer C's bill pay interface is a person-to-person interface) or possibly by a participant in the system that is not a bank nor an agent of a bank or by the payment network 102. It should also be understood that bank C and bank B need not fit the strict legal definition of a bank, but can be any manner of financial institution which the payment network operator allows to occupy the role of Bank C and/or Bank B.

The materials passed between the participants include customer invoice 120, bill pay order 122, payment message 124, A/R data file 40 and transfer order 130. Payment network 102 includes a settlement subsystem 104, a clearing subsystem 106, and a universal biller reference file 108 and may also include functions provided by Banks C an B as well as biller B.

In system 100, each consumer has a bank at which they maintain one or more accounts (or other means of guaranteeing funds to Bank C) from which they wish to pay bills and each biller has a bank at which they maintain an account into which they wish to receive payment funds. If Bank C is handling C's bill payment, but the account from which the funds are drawn is not at Bank C, the Bank C is acting as C's service provider. The consumer bank and the biller bank need not be different banks, but are shown separately nonetheless. Presumably, consumer C has chosen a bank, Bank C, which provides C with C's preferred method of bill pay order 122 entry at an agreeable price, and biller B has chosen a bank, Bank B, which provides biller B with biller B's desired format of receiving A/R data file 40 at an agreeable price. Additionally, some of the roles of Banks B and/or C may be performed by non-bank participants. Biller B's desired format is one which biller B selects to avoid the cost and occurrence of exception item processing. Each biller is assigned a unique identifier, the biller reference number, or BRN, which may comprise n digits with the n-th digit possibly being a modulus 10 check digit. In the examples described herein, n=9 and "918-272-642" is used as biller B's BRN. Non-numeric BRNs are also possible. Note that other check digit algorithms besides modulus 10 may be used in the present invention.

Biller B's BRN appears on bill 120 sent from B to C; bill 120 also includes an indication that biller B will and can accept electronic payments through this system (usually identified with a payment network service mark), an indication of B's BRN, an amount due, possibly a due date, and C's C-B account number. Since a physical coupon is no longer needed by biller B, bill 120 could just as easily be an electronic invoice as a postal mail paper invoice.

Bill pay order 122, shown passing from consumer C to Bank C, is either passed by hand, postal mail, telephone or electronically; electronically, however, is more likely. Order 122 contains B's BRN, C's C-B account number, an amount, a desired transaction date, the source of funds, and authorization to pay the stated amount to the biller with that BRN. With more complex orders, multiple transaction dates and/or amounts might be provided in addition to other data C wishes to pass to B or that B may require. Consumer C and Bank C or any other originating participant that may be used by Consumer C are free to agree on any order delivery system which provides this data, be it computer-based, telephone-based, etc., and the means for verifying the authorization to debit funds, within the parameters of the payment network rules. One such example is a system where Bank C maintains tables of static data, and the elements of order 122 contain pointers to that static data instead of the actual data, thus providing consumer C a shorthand means of entering the elements of order 122.

Payment message 124 passes from Bank C to Bank B via payment network 102. Significantly, although message 124 could contain B's account number 26, the final destination of the funds, it does not need to do so and typically doesn't. The payment network also does not know the number of account 26, but it could. If the payment network knows the account number, it adds the account number as it receives payment message 124. Another advantage to biller B is that B can change account numbers with Bank B without having to indicate the change to other parties. Another advantage to biller B is that, since only Bank B knows biller B's account number, only Bank B can initiate debits against that account. One advantage to consumer C is that they can change banks completely and continue making electronic bill pay remittances, having only to subscribe to an electronic bill paying service with another participating payment network bank and without needing to make additional arrangements with other parties. This compares very favorably with the effort needed to change an automatic withdrawal payment, or a relationship with a service bureau, each of which requires the consumer to stop the previous relationship and send a new voided check out.

The content of payment message 124 is checked by Bank C for validity and invalid payment messages are stopped either by Bank C or payment network 102 if the message does not meet predefined edits. An edit is a mask or set of rules defining what does or doesn't look like a valid transaction. In some systems, the transactions go through even though they do not match the edits, but with a flag to indicate that they failed an edit test. It should be understood that payment network 102 need not be a localized system as shown in FIG. 4, but could be implemented by a distributed system such as an ATM network or the Visanet® network, with participating banks and any other payment originating participants duplicating, or having access to, biller file 108.

Message 124 includes a BID (bank identification) identifying Bank C, a BID identifying Bank B, a BRN identifying biller B, a C-B account number identifying consumer C with biller B, an amount, and potentially the implicit guarantee of Bank C to provide good funds to cover payment in the amount indicated by the message. Bank B's BID is found by using universal biller reference file (UBF) 108, or copies, as a look-up table.

Depending on the implementation, message 124 might also include a date/time stamp and unique message identifier which distinguishes a message from all other messages. Payment messages might also include additional information which is to be passed between consumer C, biller B, Bank C, and Bank B, in an agreed-upon format, to effect financial transactions (service charges, consumer C's internal descriptions which they desire to appear on future invoices from biller B and/or on bank statement 38), or non-financial messaging between participants.

A/R data file 40, passed from Bank B to biller B in an agreed-upon format with an agreed-upon timing, indicates which payment messages 124 having a specified data format were received by Bank B for biller's BRN, and includes the individual payment amounts and C-B account numbers of each payment message 124 received. Because biller B and Bank B are free to decide among themselves how A/R data file 40 will be presented to biller B, biller B can take advantage of the economies of scale once enjoyed by billers when all payments were received by postal mail, since the biller receives A/R data file 40 in the same way for all of B's customers who are participants, regardless of which originating participants the consumers use or what mechanism the consumers used to initiate the bill pay process. Even if some payments arrive in the usual, non-exception item, manner, biller B can arrange for Bank B to provide file 40 in a form which is similar enough to B's usual A/R data file payment processing format and method, so the payment network payments are not exception items, as they are in the prior art where biller B is not a participant and thus cannot control how payment information is formatted and received.

Payment network 102 maintains biller file 108, which has one record per BRN and is used by Bank C to look up information to be displayed for a consumer under certain circumstances and to update locally maintained copies 158 of the file. FIG. 5 shows the structure of universal biller reference file 108. In file 108, a record for a biller is retrieved by the biller's BRN, the file's key. Each record includes a key (a BRN), a biller bank ID (BID), one or more C-B format masks (CBMASK), name and address of the biller as it appears on the payment coupon included with their bill (to provide consumers with feedback as to whether the correct BRN was entered during a payment or enrollment process), and other useful biller information. The specific record for biller B is located using the BRN 918-272-642. Biller B's record in file 108 indicates bank B's BID and a CBMASK for biller B. As should be apparent from the above description, a BRN can identify both Bank B and the biller. However, the BRN need not identify bank B in locally maintained copies, 158, of the biller file where biller file 108 is the master copy maintained by payment network 102.

The BID, which is "493217" in this example, identifies the destination bank of the payment message, which in this case is Bank B. The BID relieves consumer C from having to know to which bank to send payments, or which account at that bank to credit. With the combination of the BRN and the BID, the destination bank can be identified, and with the BRN, the destination bank can use a privately held file, biller account number (B-acct) table 140 (see FIG. 6), so that consumers and consumer banks are not aware of biller B's account number. One advantage to this arrangement is that, outside of Bank B, biller B's account number is not known, so it would be less likely that someone other than Bank B and biller B could present a withdrawal transaction to that account. One type of withdrawal from biller B's account which is possible knowing only biller B's BRN is a payment reversal message, which is only allowed in those payment networks which allow unsecured payments to be reversed, and a withdrawal can only affect a previously submitted payment message. However, given that the payment reversal message is tied to a payment message, a properly set up payment network cannot be used to effect a net withdrawal (of course, biller B's account might get assessed service fees for the reversal).

The field CBMASK is used to validate C-B account number format, and identifies the format of biller B's C-B account numbers. Multiple CBMASKs are possible per BRN. For example, if biller B was a Visa® card issuer, the biller's CBMASK might be "4932^####^####^###C", which indicates that a valid consumer's account number with the Visa® card issuer must begin with "4932", followed by three groups of four digits (0–9), the carets ("^") indicating optional spaces, and "C" indicating that the last digit is a check digit. Additionally, the CBMASK field might include a procedure for calculating allowed account numbers, ranges of account numbers or check digits. A Visa® card issuer is used as an example, and file 108 might also include a record for a utility company whose CBMASK is "###-A-##x", where "A" indicates that a letter must be present in that location and "x" indicates that the last character is not important to identifying the consumer and can be anything.

FIG. 5 shows BRNs in a form using spacers which is easily read and remembered by a person, although data processors typically store and manipulate the BRNs without need for the spacers. The last digit of the BRN is a modulus 10-check digit, which is used to detect errors in BRNs supplied by consumers. Using the above notation, a BRN is checked against the form ###-###-##C, where C is calculated as a modulus-10 check digit. Of course, other check digit algorithms or error correcting and/or detection algorithms could be used instead of the modulus-10 check digit algorithm. In fact, multiple algorithms could coexist, if the BRN, CBMASK itself or the biller file 108 contains a subfield (e.g., the first digit) which indicated which algorithm is to be used.

In a variation of UBF 108, the first digit(s) of the BRN indicates a particular geographic region or the biller's industry, and UBF 108 is subdivided into individual files for each region or industry. This could be used as a means for market separation, efficient file storage, or specialized reporting requirements.

Figure 6:
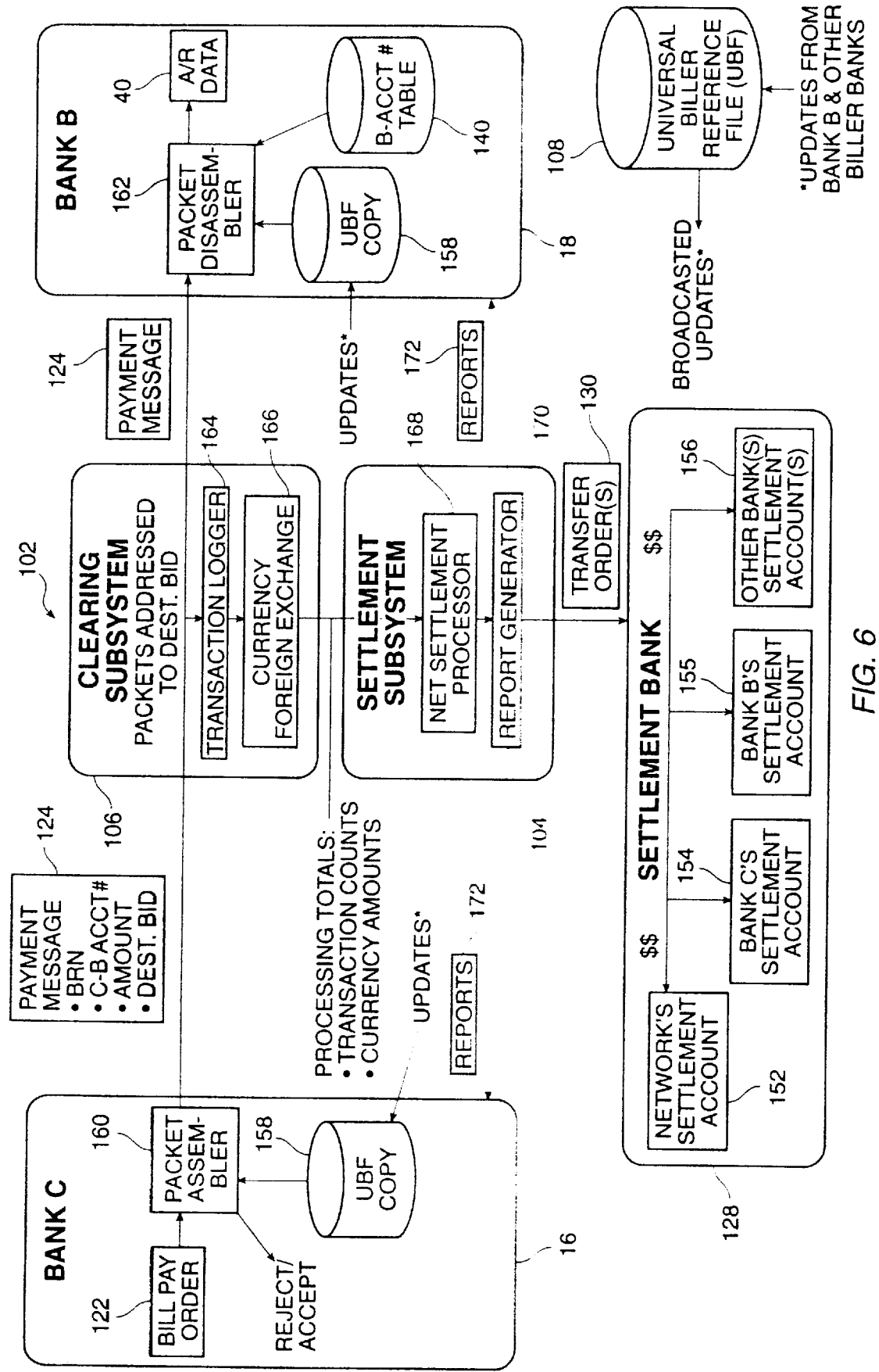
FIG. 6 is a more detailed description of the payment network shown in FIG. 4.

FIG. 6 is a more detailed block diagram of payment network 102 and its environs, which shows how payment message 124 passes from Bank C through clearing subsystem 106 to Bank B. Clearing subsystem 106 is used to log and transfer payment messages 124 from consumer banks to biller banks. Consumer banks and biller banks need not be separate; a bank can be both a biller bank and a consumer bank if it provides the necessary elements of both. Settlement subsystem 104 is coupled to clearing subsystem 106, and is used to transfer funds (or simply net funds) between Bank C and Bank B, and all other consumer and biller banks participating in the payment network, according to the payment messages received and processed by clearing subsystem 106. Settlement subsystem 104 does this by submitting transfer orders 130 to a settlement bank 128.

The major blocks shown in FIG. 6 are Bank C 16, Bank B 18, payment network 102, and settlement bank 128. Bank C is shown with a packet assembler 160 coupled to a UBF (universal biller reference file) copy 158 and to clearing subsystem 106. Bank B is shown with a packet disassembler 162 coupled to clearing subsystem 106, biller account number (B-acct) table 140, and a UBF copy 158 used when Bank B is a consumer bank or when Bank B seeks to independently check C-B account numbers. In an alternate embodiment, the B-acct table is maintained in settlement subsystem 104 rather than at Bank B; which is more convenient for biller banks which don't want to be the ones to do the conversion between BRN's and biller account numbers.

Payment message 124 is shown with four components: a BRN, a C-B account #, an amount, and a destination BID. The destination BID need not be inserted in payment message 124 by bank C, but instead could be inserted by payment system 102 using the (master) UBF 108. Settlement Bank 128 is shown with four accounts: a settlement account 154 for Bank C, a settlement account 155 for Bank B, a settlement account 152 for the payment network, and a settlement account 156 representing settlement accounts for other banks besides Bank C and Bank B. Settlement bank 128 is shown coupled to settlement subsystem 104 to accept transfer orders 130, which would then result in transfers of funds between accounts 152, 154, 155 and other accounts for other banks 156. The accounts 152, 154, 155, 156 might comprise multiple accounts, such as where each bank maintains a settlement account for a variety of currencies or purposes.

Clearing subsystem 106 is shown with a transaction logger 164 coupled to a line carrying payment message 124 and to a currency foreign exchange module 166. Settlement subsystem 104 is shown with a net position settlement processor 168 and a settlement report generator 170 coupled to reporting lines 172. Reporting lines 172 are coupled to the banks 16,18 to provide data about net settlement amounts, summary data about payment messages, and currency exchange data, if necessary. In a nonguaranteed payment network system, clearing subsystem also allows NSF messages to follow payment messages to cancel out a payment message sent earlier. In a mixed system, a flag in UBF 108 might indicate which billers are willing to receive nonguaranteed payments and which are willing to receive only guaranteed payments, so that Bank C may assess their risk accordingly.

Bank C uses packet assembler 160 to check the data in payment message 124 before it is sent out. Bank C secures funds in the amount of message 124 if it has not already done so, and rejects the transaction before sending message 124 if the funds are not secured and the biller expects a guaranteed payment. Packet assembler 160 also checks the supplied BRN and C-B account number against UBF copy 158. If the BRN is not found in file 158, the transaction is rejected. If the BRN is found, but the C-B account number does not meet the criteria set by CBMASK, the transaction is rejected, thus saving biller B or Bank B the expense of rejecting the transaction, and providing quicker response to Bank C and consumer C as to the transaction's invalidity. Alternatively, biller B might request that messages which fail the CBMASK test be sent to them with an indication that they failed the CBMASK test. UBF copies 158 are kept up to date by payment network broadcasts of updates to UBF 108 which come from Bank B and other biller banks.

If the transaction is allowed by Bank C, message 124 is sent into payment network 102, and is received by Bank B. Often, this passage of the message is the entire transaction. Although the transaction is actually between Bank C and Bank B, it is actually a transfer from consumer C to biller B because of the pre-agreed protocols for funds transfer.

Table 140 stores BRNs and biller account numbers such that a BRN can be used to look up a biller's account number. Table 140 might also contain information indicating the desired data transfer protocol for transferring file 40 to biller B. Table 140 does not need to exist outside of Bank B, and if Bank B desires, table 140 could be eliminated altogether if its functionality is folded into table 108 and the information provided by table 140 is added to payment messages 124 sent from payment network 102 to Bank B.

In one specific embodiment, authorization for a bill pay order is assured by providing a machine-readable card 320 and a card reader 322 to consumer C. Card reader 322 is coupled to Service Bureau 312 and Bank C 304, and indicates whether or not consumer C is in possession of machine-readable card 320. If consumer C is in possession of machine-readable card 320, and passes it through card reader 322, card reader 322 will transmit this event and it will be considered evidence of authorization by consumer C for the bill pay order. For data entry convenience, the card provided to C might include, for one or more billers, a BRN, C's ID, the C-B account number for that biller. If more than one biller is included on the card, an identification of the biller, such as the biller's name, might also be included so that the correct biller can be selected. Such a card can be used by consumer C at home in conjunction with a card reader 322 or, alternatively, could be used in another environment such as that of an agent facilitating payments to biller B, in conjunction with a card reader 322.

Using bill pay system 100, consumers can pay bills presented by billers easily, quickly and accurately, without having to make separate arrangements with each biller in advance. Billers can accept and process bill pay remittances quickly and less expensively than before. Billers also need not deal with each individual consumer in their customer base, but can make arrangements with the biller bank to be attached to bill pay system 100. Billers also have a preferred electronic process they can advertise to consumers wishing to remit bill payments using bill pay system 100. Using bill pay system 100, consumer banks and biller banks are free to provide different interfaces between the banks data processing systems and their customers (consumers and/or billers) to facilitate bill paying depending on the needs and wants of their customers. Even while many consumers use different interfaces to insert bill pay transactions into the consumer banks' bill pay processing systems, and while many billers receive necessary A/R data from their banks in different formats for each biller, the bill pay transactions can flow from consumer banks to biller banks using a novel payment network according to the present invention. With the apparatus described above, and usually in conjunction with a symbol or trademark identifying banks and billers as participants who agree to a set of regulations prescribing payment network activities, good funds can flow from consumers to billers in much less time than was previously possible and with much greater assurance of payment.

Figure 7:
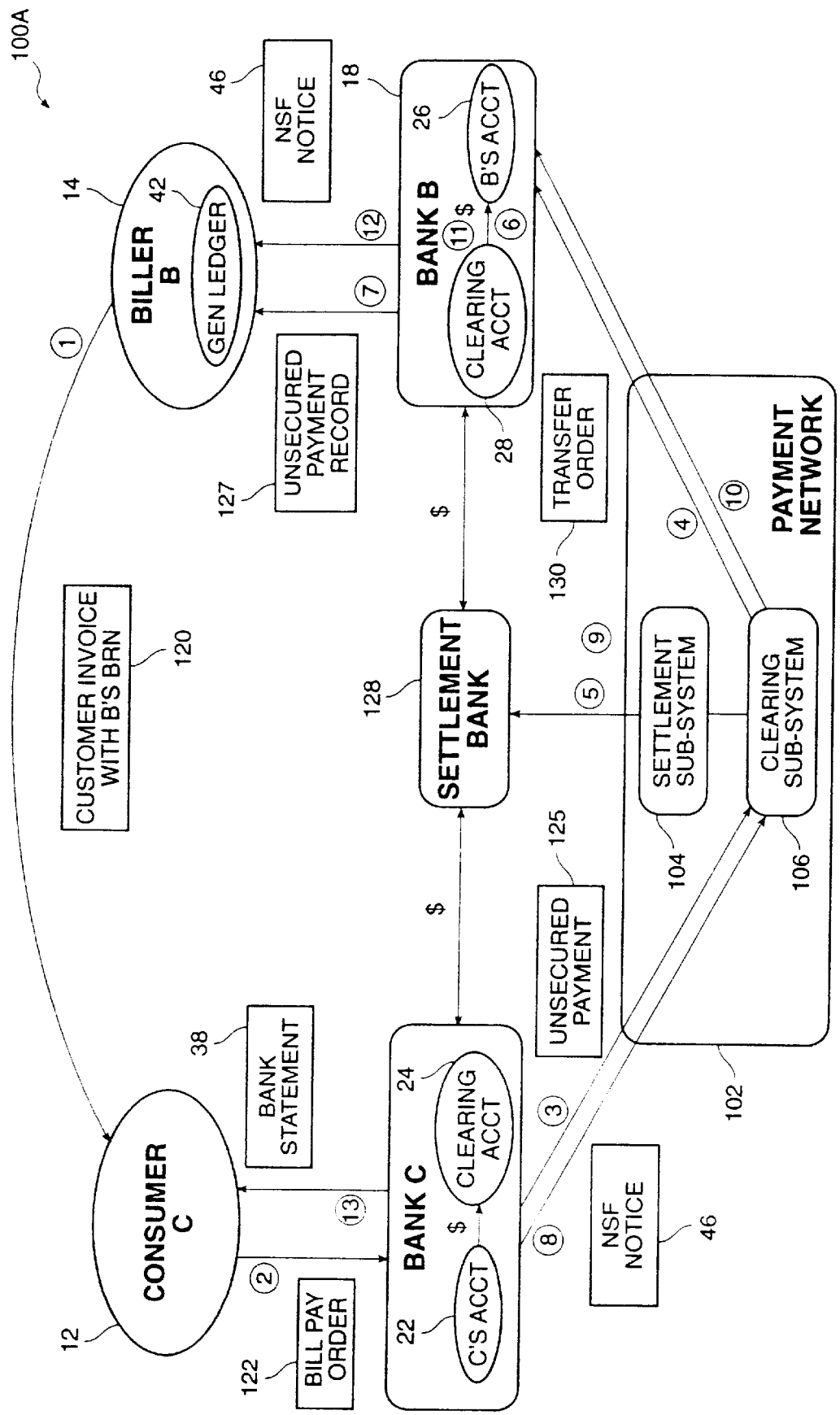
FIG. 7 is a block diagram of a variation of the electronic bill pay system shown in FIG. 4, wherein unsecured payments are processed and subsequently reversed through the payment network due to a non-sufficient funds (NSF) condition of the consumer's account.

FIG. 7 is a block diagram of a variation of the electronic bill pay system shown in FIG. 4, where the consumer's bank is allowed to follow up a payment message with a payment reversal message (shown as an NSF notice 46). Additional links are shown as part of payment system 100A. In this system, consumer C issues bill pay order 122 as before, but Bank C issues an unsecured payment message 125 to payment network 102 (arrow 3), which is passed to Bank B (arrow 4). Sometime after sending an unsecured payment record 127 to B (arrow 7) (which informs biller B, in a non-exception item way, of the occurrence of message 125), Bank C determines that consumer C's account does not contain sufficient funds to cover the amount of the previously submitted unsecured payment message 125. Bank C therefore submits an NSF notice 46 to payment network 102 (arrow 8) which passes to Bank B and biller B (arrows 9–12) resulting in the reversal of the previously submitted unsecured payment 125 from B's account 26 at Bank B and the effects of record 127 from B's general ledger 42. While arrows 3 and 8 and arrows 4 and 10 are shown as separate links, often the same path will be used for payment messages and payment reversal messages such as NSF notice 46.

Figure 8:
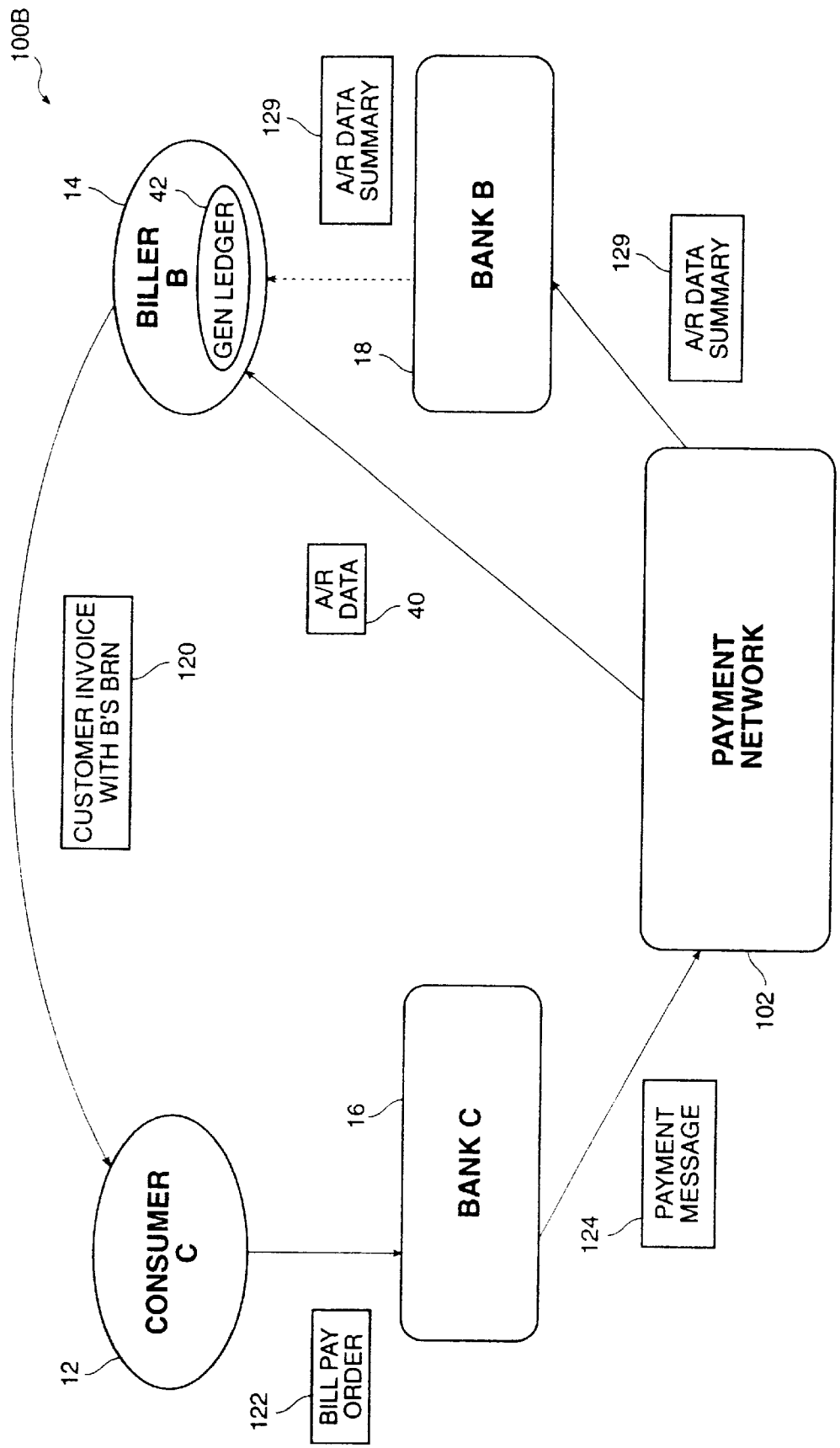
FIG. 8 is an abbreviated block diagram of the electronic bill pay system shown in FIG. 4 showing the optional delivery of accounts receivable data directly to a biller by the payment network.

FIG. 8 is an alternate configuration 100B of a bill pay system wherein the payment network operator provides payment data directly to the biller. FIG. 8 shows bill pay system 100B with consumer C, Bank C, payment network 102, bank B, and biller B. Biller B sends invoice 120 to consumer C, who sends bill pay order 122 to Bank C, which issues payment message 124 into payment network 102. Payment message 124 is passed on to Bank B, but the A/R data (date, amount, C-B account # and other data as desired or required by consumer C or biller B) from message 124 is passed directly to biller B, on behalf of Bank B, and is used to update biller B's G/L database 42. In some cases, this method might be preferred by biller B who can obtain the data sooner, and by Bank B which is no longer obligated to maintain and transfer A/R data to biller B. This is a good alternative for high-volume billers. Optionally, Bank B will provide A/R summary data 129 to biller B. Also, UBF 108 can record the preferred transaction format desired by B so that 102 can deliver B's transactions in the desired format after conversion. Alternatively, 108 can contain transaction templates that an originator can use to create (complex) transaction formats desired by the recipient, e.g., as in commercial payments for ANSI X12 EDI formats.

This embodiment of the invention includes a number of services that a biller may provide for the benefit of the customer. For example, the biller may support electronic invoice presentment, two way communication, test transactions, etc. In addition, service providers to consumers may not be able to support all biller capabilities. By modifying the UBF, the biller identifies those services which it can provide. The service provider can then determine whether it can or needs to support those services, without specific communication from the biller.

Figure 9:
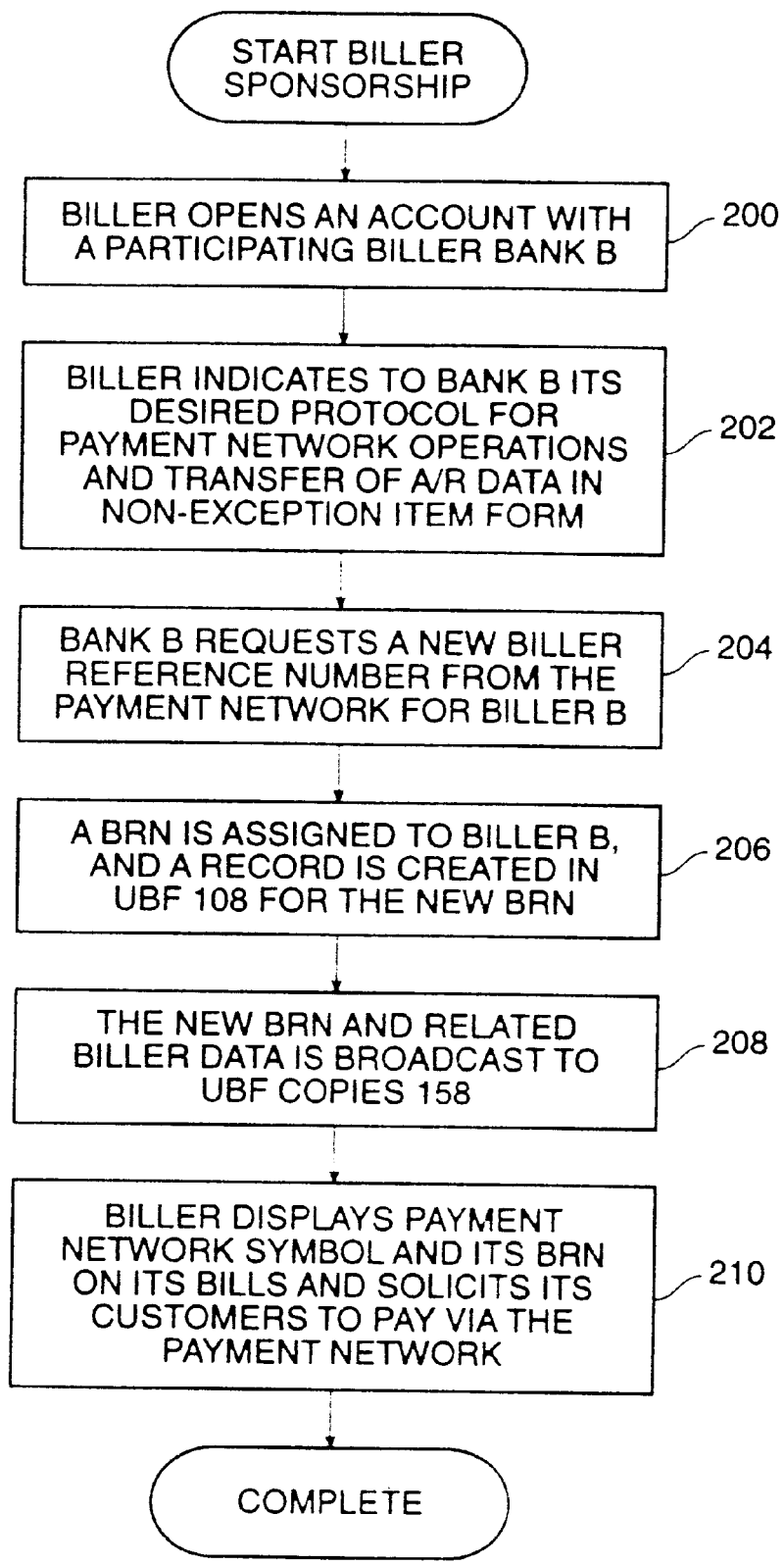
FIG. 9 is a flowchart of a process for a biller bank to sponsor a biller in an electronic bill pay system according to the present invention.
Figure 10:
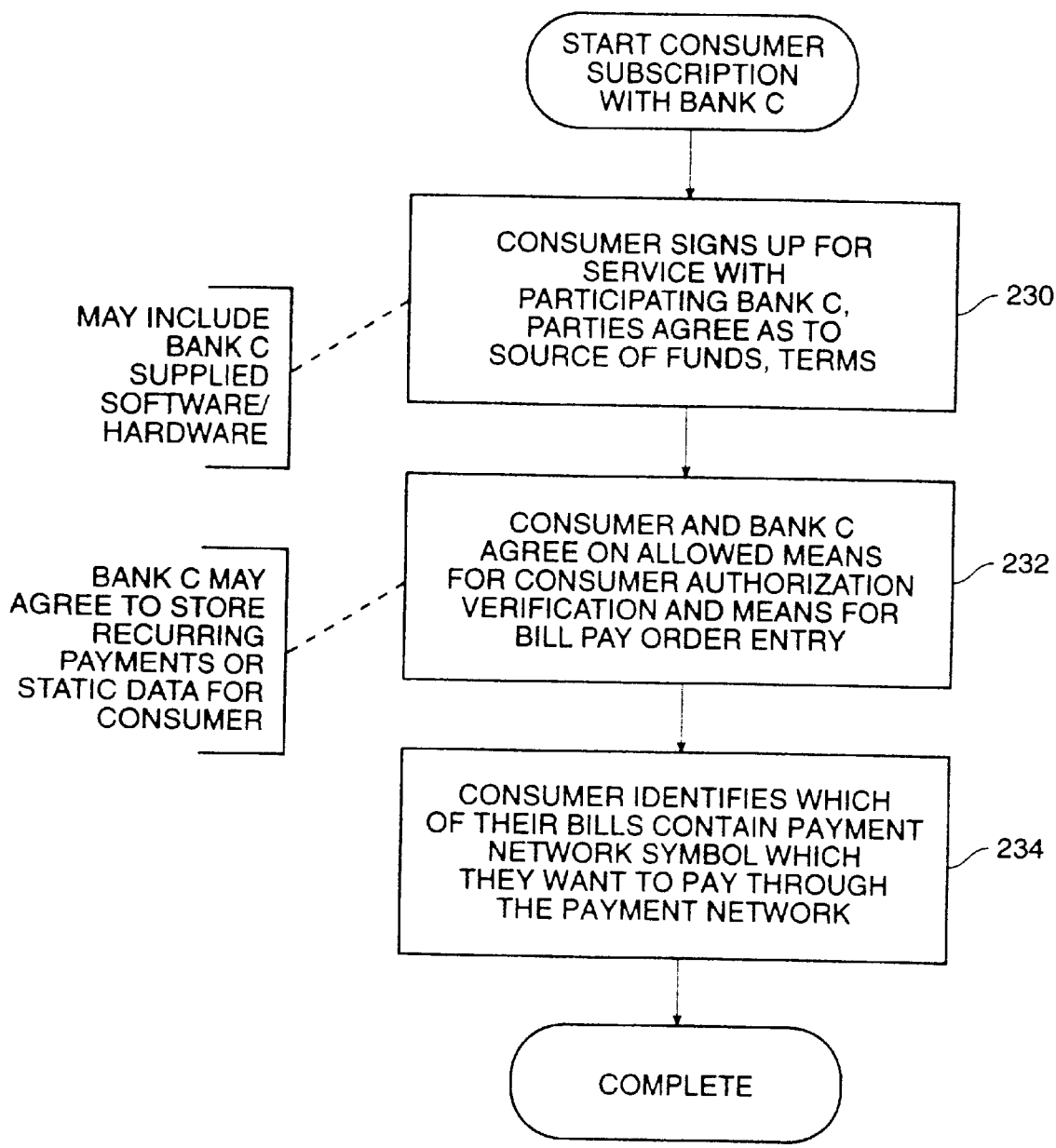
FIG. 10 is a flowchart of a process for a consumer to subscribe to a bill pay service provided by a consumer bank in an electronic bill pay system according to the present invention.
Figure 11:
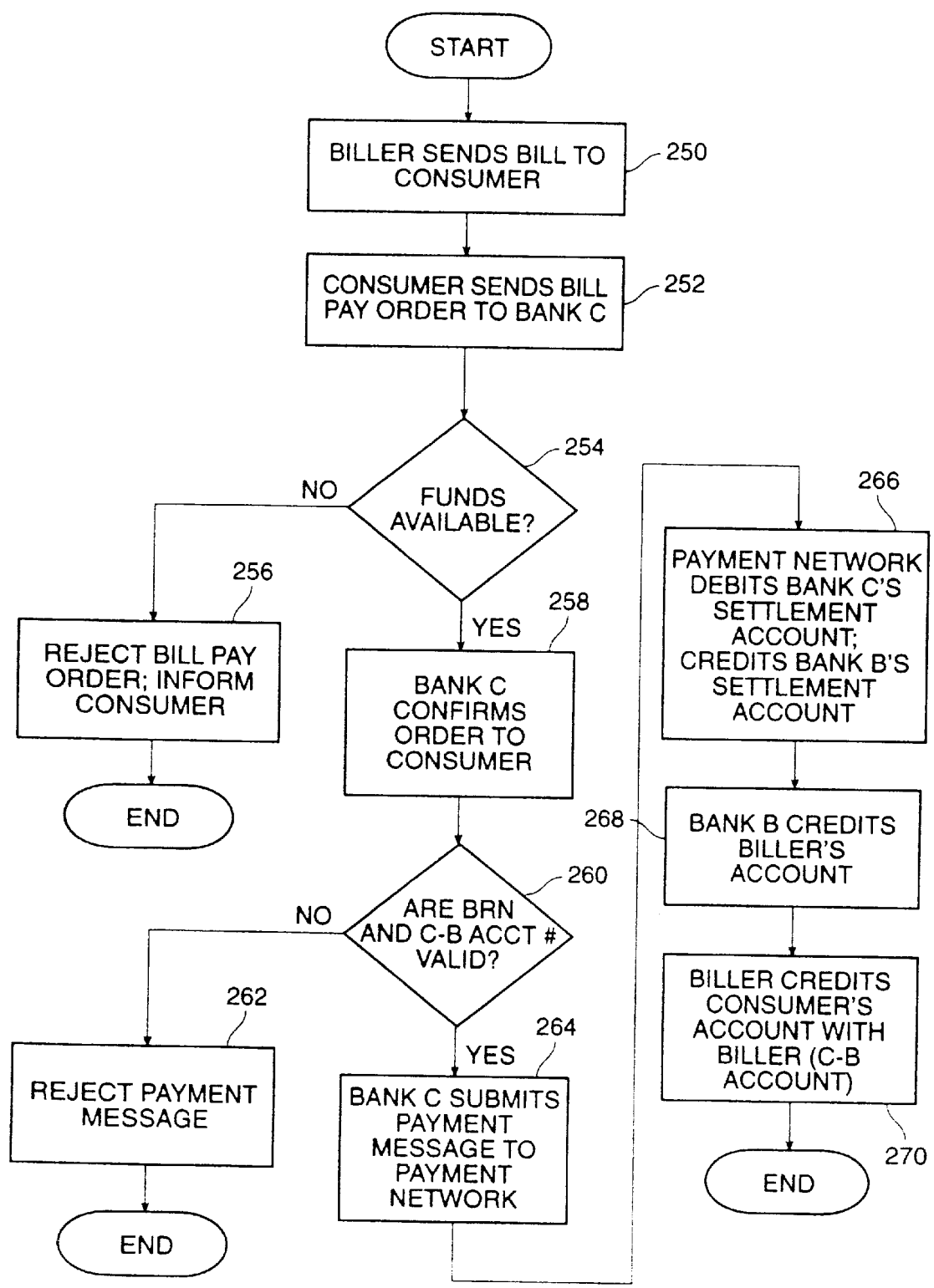
FIG. 11 is a flowchart of a process for a bill pay transaction by a participating consumer to a participating biller according to the present invention.

FIGS. 9–11 describe processes according to the present invention for facilitating consumer bill payment to billers using the previously described apparatus or other apparatus not illustrated here. The processes described in the flowcharts of FIGS. 9–11, in some embodiments, involve manual data entry, automatic data capture, person-to-person interaction among the participants, and/or appropriately UBF programmed computers and computer networks. However, in a preferred embodiment, most of the steps of the process are performed by software routines in computers, computer networks, and telecommunications equipment.

FIG. 9 is a flowchart describing the process of converting a nonparticipating biller into a participating biller. A participating biller is an entity which bills its customers and collects funds for those bills at least partially through an electronic bill pay system according to the present invention.

The process of a biller becoming a participating biller begins at block 200 when the biller opens a bank account with a participating biller bank. Of course, the biller might already have such an account, in which case this step can be skipped. A participating biller bank is a bank which has agreed to accept payment messages from consumer banks through the payment network in a form specified by the operator of the payment network. A participating biller bank also agrees to maintain a settlement account which the payment network can debit/credit for the net of all transactions (originals, returns, etc.) involving all of the billers sponsored by the biller bank. A participating biller bank also agrees to transfer funds in the amount of received payment messages to billers' accounts and, if necessary, to maintain in their data processing systems a cross-reference table which can be used to identify a biller's account number from just a unique BRN (biller reference number) assigned to the biller, and to abide by the terms and conditions of the payment network rules for services they offer billers.

As part of the agreements with the payment network operator, the banks agree to the terms of processing fees and interchange fees. In this way, the interchange fee can serve as a cost-balancing device. These fees might be paid by the consumer banks and/or the biller banks, and in some cases, some fees will be paid to the consumer banks or the biller banks, in the form or interchange fees. With interchange fees, transactions which otherwise would be uneconomical to one party can occur. The interchange fee is easily collected in the transfer orders submitted to a settlement bank; the transfer orders can move money in any direction between the accounts of the consumer banks, biller banks, and the payment network's settlement account.

At block 202, the biller and the biller bank agree on a data transfer protocol for transferring A/R data included in payment messages sent to biller bank so that the A/R data can be efficiently (and usually electronically) transferred to the biller. This step may include a connection of leased or dial-up lines between the data processing systems of the biller bank and data processing systems of the biller. Alternatively, the biller bank may sponsor a biller direct connection to the payment network. The agreed-upon protocol between the biller and the biller bank might include terms such as the arrangement of the data to be transferred to the biller, the frequency with which the data is to be transferred, and/or the service charges biller bank collects from biller for the provision of data. One method of implementing such an agreement is for the operators of payment network 102 to provide Bank B and/or the biller with equipment with which to receive, transmit, reformat and otherwise manipulate items associated with payment system 100.

While provision of A/R data will be generally expected by billers, it is also possible for the biller and biller bank to agree that biller bank will just deposit the funds and not provide A/R data. Such might be useful for payments to charitable collection funds. At this point, the biller will also indicate to biller bank what constitutes an acceptable C-B account number to biller, so that the biller bank can send it to the payment network for insertion into UBF 108 and subsequent broadcast.

UBF 108 can contain additional information specifying:

B's preferences with regard to optional services participation, e.g., electronic invoicing, B's processing requirements, e.g., transaction formats, other data formats, file delivery protocols, etc.

B's selection of a feature or service sub-variant, e.g., invoice receipt confirmation, B's preferences or requirements regarding the way certain features or services from B are presented to C by Bank C, e.g., graphical rendering requirements for invoice presentation.

Once the biller and biller bank have agreed to a protocol, then at block 204, the biller bank requests a new biller record from the payment network. In response, at block 206, the payment network issues a new biller reference number which is unique to the biller. In an alternate process, the payment network assigns a pool of numbers in advance to the biller bank, from which the biller's BRN is drawn. The biller bank, in that case, instead of requesting a number, informs the payment network of the activation of a BRN from its pool and the format of acceptable C-B account numbers for that BRN plus other biller-unique data normally printed on a payment coupon for verification that the BRN is the BRN of the desired biller, as well as other data regarding service features, processing requirements, etc. that biller B wishes the UBF 108 to contain. In a preferred embodiment, this process occurs substantially electronically.

At block 208, the payment network publishes/broadcasts the new participating BRN and related data to all participating consumer banks to enable consumer validation of biller, routing of vendor A/R data and satisfying of biller B data or processing requirements.

Finally, at block 210, the biller identifies its BRN to its customers, especially on its bills and mailings announcing the new service, and biller is then set up to accept payment network payments. Billers may also at this time actively solicit payment network-based payments from their customers.

In a preferred embodiment, the process is highly automated and simple for a biller. It is expected that the payment network system will have as many participating banks as now participate in the Visa® system. Since this is nearly all major banks, there will be a high probability that any given biller's bank will be a participating bank. Therefore, the biller need only sign up for the payment network service with its existing bank, receive a BRN and publicize its BRN number.

The UBF table record format in the preferred embodiment of the present release of the present invention is illustrated in Table 1 below: (The UBF table reward format is anticipated to change and expand as enhancements are added to the service over time.)

| Position | Field Length | Format | Contents | Edit Criteria |
|---|---|---|---|---|
| 1–2 | 2 | UN | Transaction Code | This field to contain 33. |
| 3 | 1 | UN | Transaction Code Qualifier | This field to contain 0. |
| 4 | 1 | UN | Transaction Component Sequence Number | This field to contain 0. |
| 5–10 | 6 | UN | Destination BIN | This field will contain a valid BIN. |
| 11–16 | 6 | UN | Source BIN | This field will contain 400008 (the BASE II table distribution BIN). |
| 17–19 | 3 | AN | UBF Identifier | This field will contain UBF. |
| 20 | 1 | AN | UBF Detail Record Type | This field will identify the type of UBF detail record. The field will contain B = Biller Master Record. |
| 21–32 | 12 | UN | Biller ID | This field will contain the assigned unique identifier for the Biller. |
| 33 | 1 | AN | Summary Invoice Option | This field will contain Y = Invoice Presentment supported by Biller or N = Invoice Presentment not supported by Biller. |
| 34 | 1 | AN | Biller Invoice Option | This field will contain one of the following values: 1 = Biller will always mail detail invoice; 2 = Biller will never mail detail invoice; or 3 = Biller will discontinue mailing detail invoice at customer request only. |
| 35 | 1 | AN | Previous Invoice Option | This field will contain one of the following values: 1 = Biller will mail most recent detail invoice upon customer request; or 2 = Biller will not mail detail invoice. |
| 36–60 | 25 | AN | Biller Name | This field will contain the biller's name. |
| 61–85 | 25 | AN | Biller Mailing Address 1 | This field will contain the first line of the biller's mailing address. |
| 86–110 | 25 | AN | Biller Mailing Address 2 | This field will contain the second line of the biller's mailing address. |
| 111–125 | 15 | AN | Biller City | This field will contain the biller's city. |
| 126–128 | 3 | AN | Biller State | This field will contain the biller's state, province, or region. |
| 129–139 | 11 | AN | Biller Postal Code | This field will contain the biller's postal code. |
| 140–142 | 3 | AN | Biller Country | This field will contain the country code of the biller's country. |
| 143–146 | 4 | UN | Biller Merchant Category Code | This field will contain the biller's Merchant Category Code from the UBF. |
| 147–153 | 7 | UN | Effective Date (YYYYDDD) | This field will contain the date this record is effective in 7-digit Julian format (YYYYDDD). |
| 154–160 | 7 | UN | Expiration Date (YYYYDDD) | This field will contain the date this record expires in 7-digit Julian format (YYYYDDD). This field will contain 9999365 if the record does not expire. |
| 161–164 | 4 | UN | CBAN Mask Count | This field will contain the total number of customer biller account number masks for the biller ID. |
| 165–166 | 2 | AN | Reserved | This field will contain open spaces. |
| 167 | 1 | AN | Account Verification Option | This field will contain one of the following values: Y = Account verification supported by Biller; or N = Account verification not supported by Biller. |
| 168 | 1 | AN | Reimbursement Attribute | This field will contain 0. |

UN = Unpacked Numeric, AN = Alphanumeric.

As the above example illustrates, the UBF can be used to indicate biller preferences for such options as summary invoice, biller invoice, previous invoice, and account verification. Other options and fields can be used with other subsequent embodiments of the present invention. For example, the UBF could be used to indicate a commercial pay scheme template used by the biller. Such information would enable use of the system in commercial electronic payment transactions in addition to consumer electronic payment transactions. One method is to use the UBF to identify a particular version of an ANSI X.12 standard type template used by a biller or vendor.

As FIG. 10 shows, the process for consumers to subscribe to a consumer bank's service for paying bills via the payment network system is just as simple. At block 230, a consumer subscribes to an electronic bill payment service with a participating consumer bank or other participant in the payment network capable of and authorized to initiate payment orders on behalf of consumers. Again, the consumer is quite likely to already bank at a participating consumer bank. If not, participating consumer banks can be easily identified through the use of a widely recognized logo or service mark, much the same way the Visa® service mark identifies banks issuing Visa® cards and merchants accepting Visa® cards for payment.

At block 232, the consumer and the consumer's bank agree to details of a service for consumer C to direct bank C to initiate, and pay for, bill pay orders. A bank's service need not offer all the possible interfaces or payment from more than the consumer's main deposit account. Banks might compete for customers by offering different interfaces and service charges. For example, a consumer bank might offer software to its customers, who would run the software on their personal computers, and the software would transmit bill payment orders over a modem to a modem connected to the consumer bank's data processing system. These bill payment orders might include orders to pay a bill at once, to pay a bill in the future, or to pay a recurring bill periodically. Another possible interface is a voice response system wherein a consumer dials in to a telecommunication system maintained for the consumer bank, listens to questions asked ("Which biller would you like to pay now?", "How much do you want to pay?", etc.), and the consumer responds by pressing keys on the consumer's telephone. The consumer might also use a telephone with a visual display, or an interface using the consumer's television as an interface, such as might be provided as a service of consumer's cable television provider connecting the consumer to the consumer's bank or an ATM. Although it is probably less efficient, the interface to the bank might also be via postal mail, where the consumer mails bill pay orders to the consumer bank. This alternative might be the only solution in areas where telecommunication is not readily available or where the consumer is adverse to using voice response systems or computers.

Next, at block 234, the consumer identifies which of their bills can be paid via the payment network that they want to pay using the payment network. As suggested above, if billers identify their participation in the payment network system by displaying the designated logo and/or BRN, and consumers are aware of the meaning of the logo and/or BRN, the consumers will be able to easily identify participating billers.

In other instances, a consumer who is already participating in an electronic payment system with a service provider may add a new biller. The consumer notes that a new biller includes a BRN either on or in materials associated with its invoice. The consumer initiates an electronic payment to the biller using the biller's BRN. The service provider, seeing the new BRN, assumes that the consumer wants to set up an electronic pay relationship with the new biller. An interactive communication is offered to the consumer to confirm that the biller is to be added to the consumer's account. The consumer can give the biller a nickname chosen by the consumer, with the nickname serving as an alias for the biller at the service provider. The service provider can then review the UBF data of the biller to identify those services that the new biller provides. The service provider determines what services offered by the biller that the service provider supports, and may inform the consumer that the services are offered, inviting the consumer to select those services of interest. This is all accomplished without direct communication with the biller, because the service options are identified in the biller's BRN entry.

FIG. 11 is a flowchart of a bill payment process according to the present invention between a participating consumer and a participating biller. At block 250, the biller sends the consumer a bill, via postal mail, via an alternative invoice presentment means (such as e-mail, a dynamically built World Wide Web (WWW) or internet page, an electronic bulletin board, etc.), or via any other means. This bill indicates the amount due, the biller's BRN, and a due date. Any participating consumer can pay a bill through the payment network to any participating biller. If a consumer and a biller are participants in the payment network system, and the biller sends the consumer a bill containing an indication that the biller can and will accept payment network payments, the biller's BRN, an amount due, a due date, and the consumer's C-B account number, the consumer can easily handle the payment through the payment network. Because the biller reference number is universal (different banks and different consumers all use the same number), the number can be assigned to a biller before a consumer indicates the desire to pay the biller, thus making it possible for the biller to include its BRN on the very first bill sent to the consumer after subscribing to the bill pay service. In many cases, enrollment of a biller by a consumer is not necessary, and if it is, it involves nothing more than the consumer reviewing a copy of the biller information gathered by Bank C from the UBF record with the biller's BRN, to verify that the BRN refers to the desired biller, and setting up static data tables which would allow the consumer to select a source of funds, a BRN, and/or a C-B account # with a pointer. Pointers provide quicker data entry, in much the same way as "speed-dial" provides quicker dialing of telephone numbers. By contrast, in other bill pay systems, a biller's name or number may be different in different countries, in different bill pay service provider files, or different for each consumer.

At block 252, the consumer sends a bill payment order to the consumer's bank (Bank C). The order instructs Bank C to debit C's account with Bank C (or otherwise secure funds) on the date indicated in the order by the amount indicated in the order and forward the funds to the payment network with the BRN and C-B account number indicated in the order.

At block 254, Bank C checks for availability of funds for the transaction. If the funds are not available and Bank C does not have some other agreement with the consumer, the flow proceeds to block 256, where the consumer is informed of the rejection of the bill pay order. Significantly, an order stopped for non-sufficient funds does not get very far in a guaranteed funds payment network system before it gets reversed. Of course, Bank C might continue the transaction and later try to reverse it, but if the payment network rules are such that Bank C cannot reverse a payment message once it is sent out, then this is not likely to happen. Although the funds are normally taken from C's account, by agreement, Bank C might also obtain the funds from a savings account, line of credit, credit card account, or other financial instrument of the consumer either at Bank C or at another financial by using the capabilities of payment network 100.

Assuming the funds are available or Bank C agrees to be at risk for the funds, the flow proceeds to block 258. At block 258, Bank C confirms the biller using Bank C's copy of the UBF 158, or Bank C sends a query message to the payment network asking for the data. In some cases, biller confirmation is only done the first time an order with a given BRN is requested, and Bank C maintains a list of confirmed billers on behalf of the consumer.

Next, at block 260, Bank C checks the BRN and the C-B account number in the payment order for validity. If the BRN is not valid, or the C-B account number is not valid for the biller associated with the BRN, then flow passes to block 262, where the order is rejected, otherwise the flow continues to block 264. Even though Bank C checks the order against the UBF copy, the payment network may again check the payment message formulated from the order and reject it if somehow Bank C incorrectly allowed the payment message to go through.

Next, at block 264, Bank C submits a payment message to the payment network, and by the payment network rules is liable for the amount of the payment. Because the funds pass from Bank C to Bank B through the payment network, there is very little chance that the consumer will lose money. Of course, Bank C may go out of business, but the fact that the money moved from one account under Bank C's control to another should not affect the ability of the consumer to get the funds back if a payment message was not sent. On the other hand, if the payment message was sent, by the payment network rules, the destination bank agrees to accept the payment message from Bank C and must credit the biller's account, who in turn must credit the consumer's account with the biller. Compared with using an independent service bureau, which may be holding consumer funds, the payment network provides a much safer bill pay mechanism to consumers.

At block 266, the payment network debits Bank C in the amount of the payment message, and credits Bank B (the biller's bank) by the same amount. Then, at block 268, Bank B credits the biller's account, who in turn, at block 270, credits the consumer's account with the biller. Bank B might also supply further validation services to biller B. In that case, biller B would supply Bank B with a list of valid C-B account numbers, which Bank B would use to validate incoming payment messages and return those that contain invalid C-B account numbers, which is more rigorous check of the account number than merely checking to see if the account number is in the right format.

Figure 12:
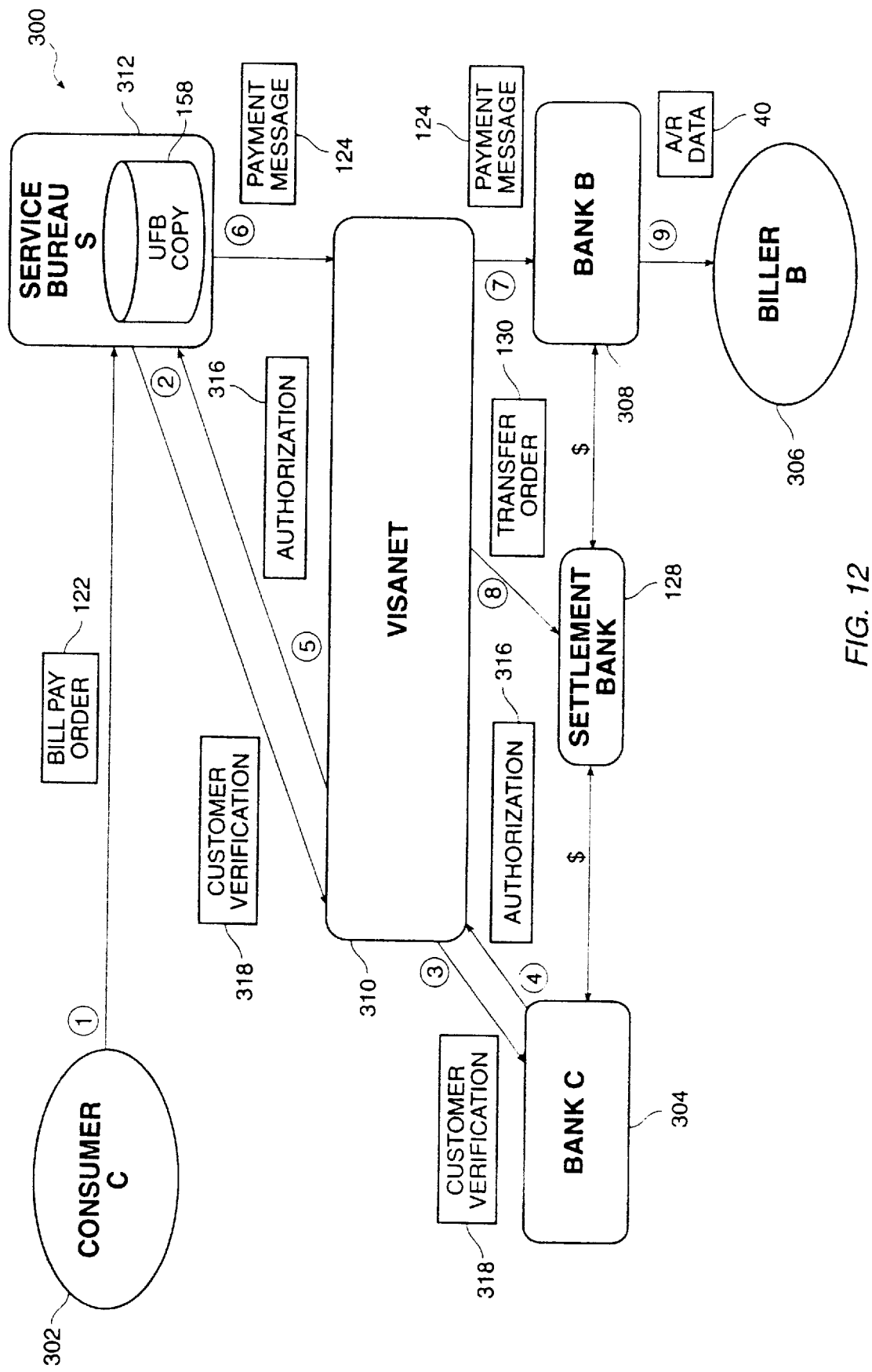
FIG. 12 is an alternate configuration of an electronic bill pay system according to the present invention wherein transactions are initiated through an existing funds network via a service bureau rather than by a consumer dealing directly with their bank.

FIG. 12 is a block diagram of an alternative bill pay system 300 wherein consumer C 302 initiates bill payment order 122 (arrow 1) via service provider S 312, interposed between C and Bank C 304, through an existing funds network 310, such as the Visanet® network, rather than by dealing directly with Bank C. Service provider 312 maintains a UBF copy 158 so that it can provide the necessary validations of payment message 124. Service provider 312, which is not C's bank, uses transactions over Visanet® network or other network to secure good funds from Bank C 304. One way to accomplish this is by submitting a customer verification message 318, which includes some form of password identifying C and the amount of bill payment transaction 122, over the Visanet® network 310 and waiting for authorization 316 (arrows 2–5) to proceed with sending payment message 124 (arrow 6). Alternatively, payment message 124 could be created by payment network 102 when payment network 102 receives the authorization 316 from Bank C.

Service bureau S, upon the receipt of authorization 316 from Bank C, submits payment message 124 over a network, such as the Visanet® network (arrows 6–7) resulting in settlement transfer order 130 being sent to settlement bank 128 (arrow 8). Alternatively, authorization 316 from Bank C can also trigger the payment system network to create both an advice message to service bureau S and a payment message 124 to Bank B. A/R data file 40 is delivered by Bank B 308 to biller B 306 (arrow 9).

Figure 13:
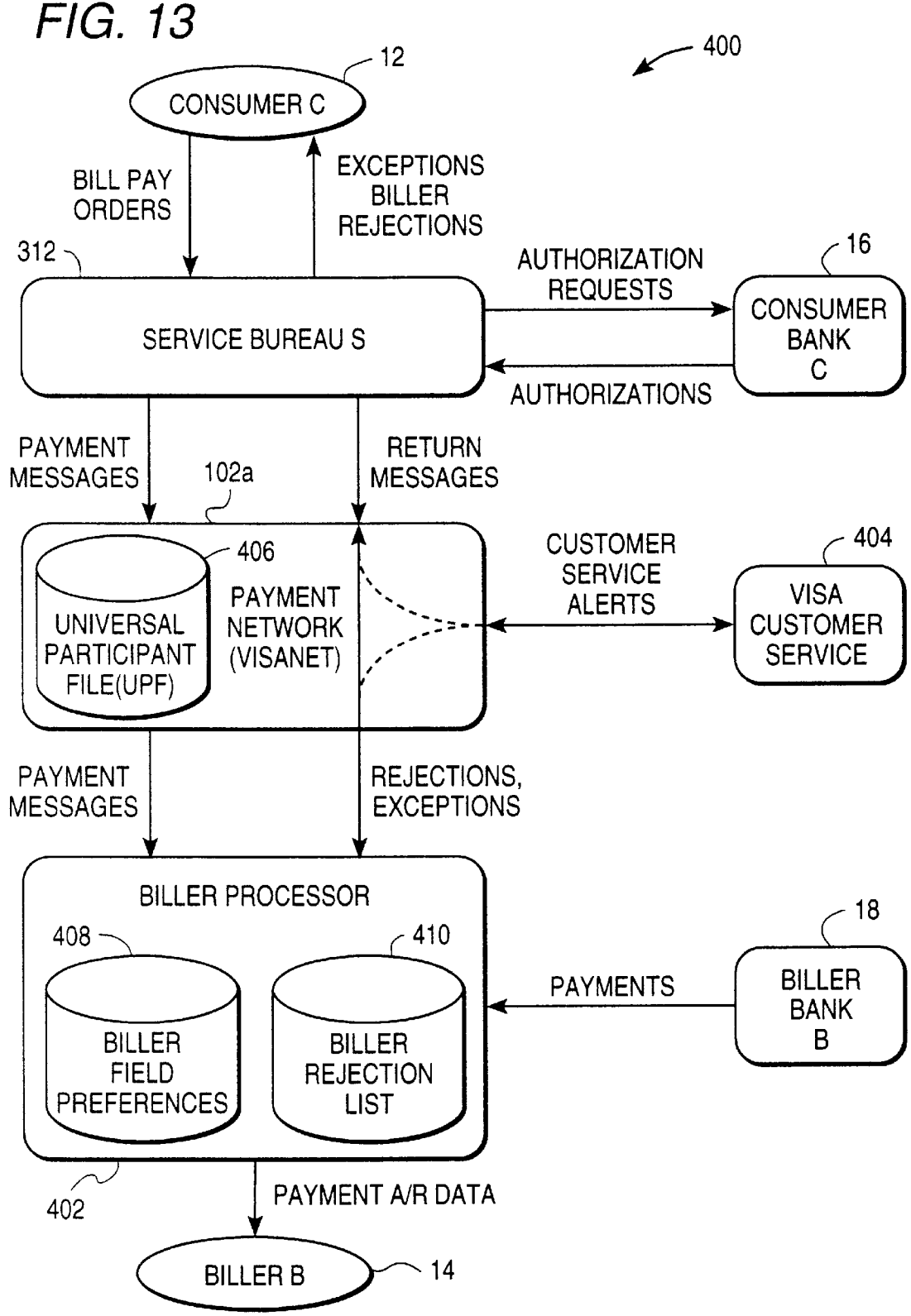
FIG. 13 is a block diagram of a bidirectional embodiment of an electronic bill pay systems according to the present invention wherein transactions flow from a consumer through the electronic bill pay systems and messages can also flow in the opposite direction to a customer service desk or to the consumer.

FIG. 13 is a block diagram of a bidirectional electronic bill payment system 400, which comprises several elements in common with bill payment systems described above, such as consumer C, biller B, consumer bank C, biller bank B and service bureau S. Bill payment system 400 also includes elements specific to a bidirectional embodiment, such as a payment network 102A, a biller processor 402, a customer service desk 404, a universal participant file (UPF) 406, a biller field preferences file 408 and a biller rejection list 410. The elements of bill payment system 400, as well as the other bill payment systems described herein are built from conventional electronic components such as computers, memories, communications subsystems, fault tolerant transactions processors, various storage media, and the like, which are configured and programmed to operate as described herein.

In order to clearly describe the operation of bill pay system 400, the elements are described in terms of who operates the element and provides the service relevant to that element rather than the specifics of the hardware and pre-existing software which are well known in the art and readily available. For example, "consumer bank C" refers not only to a bank, which is a business entity, but to the computer systems used or controlled by consumer bank C to perform the operations attributed to consumer bank C. Likewise, "consumer C 12" refers not only to a person or business entity which desires to pay bills, but also to an electronic mechanism for initiating electronic bill pay orders. Depending on the equipment available to consumer C, this electronic mechanism might include a personal computer with a modem or an ISDN communication device, a push-button telephone, a screen telephone, a telephone attached to a voice response unit (VRU), a specialized bill payment terminal, an automatic teller machine with bill payment capability or a personal digital assistant with a wired or wireless connection to the payment network.

Although shown separately, it should be apparent that the functionality of service bureau S can be incorporated into the electronic systems of consumer bank C and the functions of biller processor 402 can be incorporated into the systems of biller bank B, biller B or the payment network 102A itself. This invention has equal application when services to customer C and Biller B are provided by a non-bank affiliated third party. An example of the present invention implemented through a non-bank affiliated third party is illustrated in FIGS. 19A–19C.

Figure 19A:
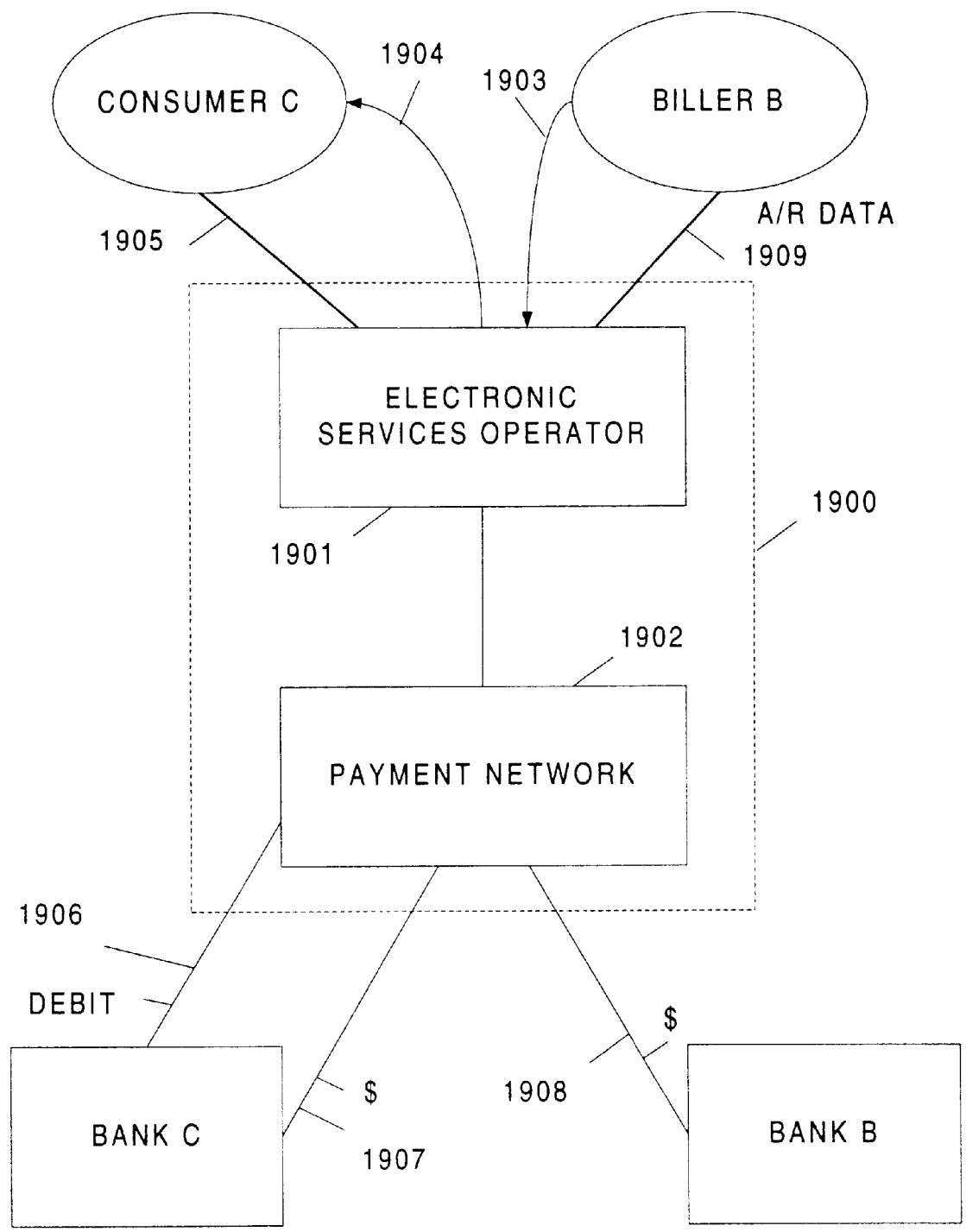
FIGS. 19A–19C illustrate alternate embodiments of the present invention.

Referring first to FIG. 19A, consumer C initiates an electronic payment transaction to electronic services operator (ESO) 1901. ESO 1901 may be an agent of consumer bank C or a non-agent of bank C who solicits consumer C directly for service. ESO 1901 may have its own payment network 1902 or it may interact with an independent payment network 1902. ESO 1901 causes money to move from consumer bank C to biller bank B in response to an electronic payment by consumer C to Biller B.

Figure 19B:
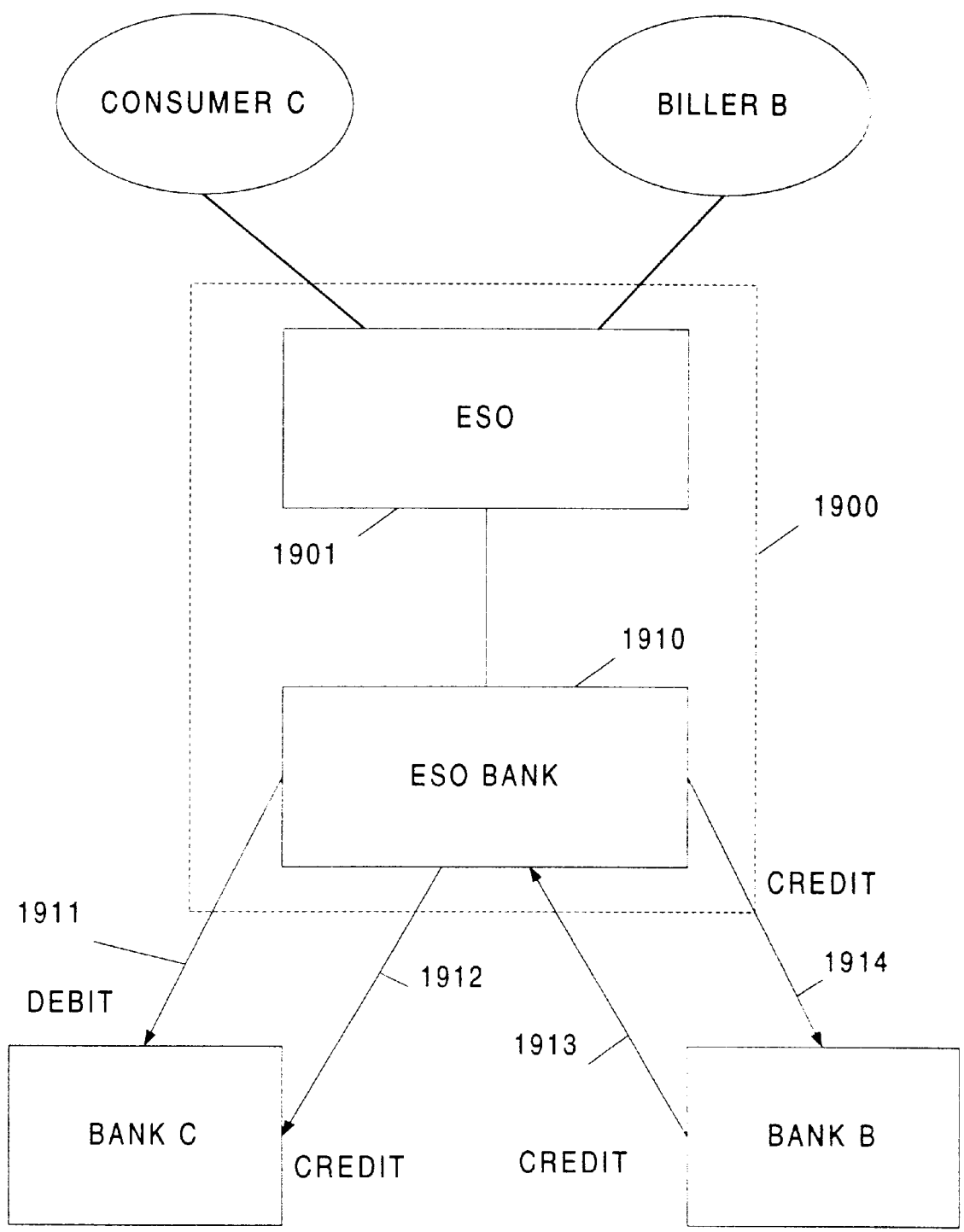
Figure 19C:
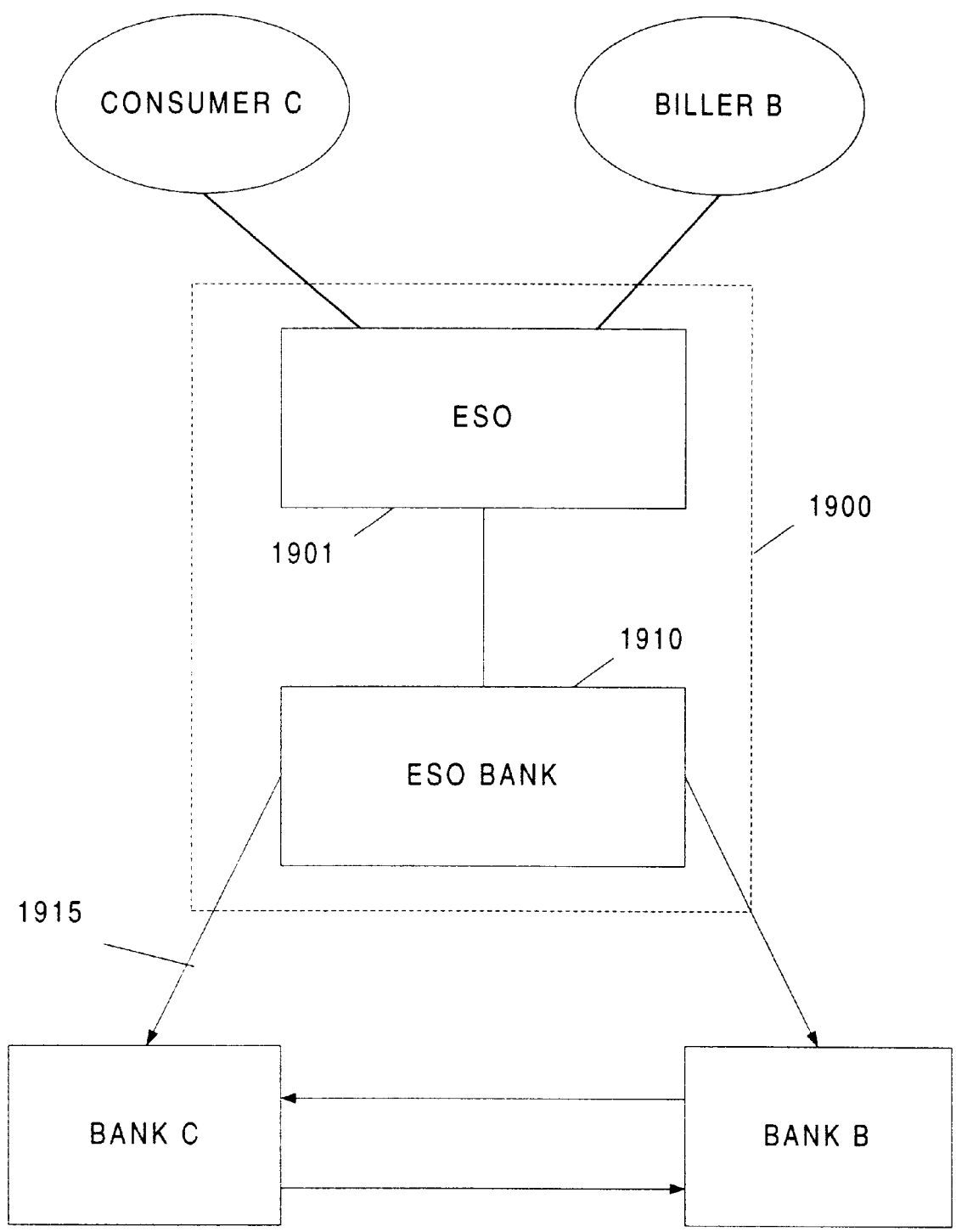

The operation of the system of FIGS. 19A–19C is similar to the operation of the system described in connection with FIGS. 4 and 8. The transaction may begin with a traditional paper invoice, or it may be initiated with an electronic invoice, indicated by waved line 1903 from biller B to ESO 1901 and transferred to consumer C as indicated by waved line 1904. The consumer C indicates payment preferences to ESO 1901 as indicated by link 1905.

ESO 1901, using payment network 1902, sends a debit message to consumer bank C on link 1906. Bank C, in turn, routes money to the payment network 1902 via link 1907. Payment network 1902 routes the money to biller bank B via link 1908. ESO 1901 sends accounts receivable information to biller B via link 1903 so that biller B can update the account information of consumer C.

In an alternate embodiment, illustrated in FIG. 19B, ESO 1901 uses its own bank 1910 instead of the payment network 1902. In such a system, the ESO bank 1902 may be a separate bank from the ESO 1901 or ESO 1901 may be a bank itself. When consumer C initiates a payment transaction in response to a bill from biller B, ESO 1901 initiates an ACH transaction. Using an ACH debit, link 1911, ESO bank 1910 can send an ACH credit to biller bank B, link 1914. If the transaction is unwound, bank B sends an ACH credit to ESO bank 1910, link 1913, and ESO bank can then send an ACH credit to consumer bank C.

In an alternate embodiment illustrated in FIG. 19C, ESO bank 1910 launches BTX messages to accomplish fund transfer. ESO bank 1910 launches a BTX message 1915 to consumer bank C with a dollar amount indicated. Consumer bank C launches a BTX message 1916 to biller bank B. If there is an unwind, ESO bank 1910 can initiate a reverse transaction with BTX message 1917 to biller bank which can then send a BTX transaction credit 1918 to consumer bank C.

An operation using the various elements of bill pay system 400 will now be described. When consumer C wishes to initiate a bill payment order resulting in a transfer of funds from an account held at consumer bank C in favor of consumer C to an account held at biller bank B in favor of biller B, presumably in settlement of an outstanding bill from biller B to consumer C, consumer C sends a bill pay order to service bureau S. Of course, the payment order need not be for a bill, but could be for a charitable donation or on-the-spot purchase of goods or services. The actual payment can be initiated either by C or by B and C's request.

Service bureau S validates the bill pay order to ensure that sufficient information is contained within the bill pay order, such as an identification of consumer C, and identification of biller B and an amount to be paid. As explained above, each biller coupled to bill pay system 400 is assigned a unique biller reference number. For reasons explained below, each consumer is also assigned a unique reference number. Collectively each of the consumers and billers (and possibly also each service bureau, customer service desk, biller processor and bank) are identified by a unique participant reference number (PRN). The BRN/PRN for the biller is generally provided to consumer C on the bill presented to consumer C. In some instances, the BRN and the C-B account number are provided on the bill in machine readable form.

Once service bureau S receives the bill pay order, an authorization request is sent to consumer bank C, which responds either with a denial of the transaction or an authorization of the transaction. If the transaction is authorized, a payment message is generated by service bureau S and transmitted to payment network 102A, or can be generated automatically by payment network 102A upon receipt of the authorization. In a typical course of events, payment network 102A forwards the payment message to biller processor 402, and payment network 102A may also perform settlement transactions as is described in reference to previously described bill pay systems. When biller processor 402 receives a payment message, it compares the fields of the payment message to preferences contained in biller field preferences file 408 and compares the consumer's PRN to a list of PRNs in biller rejection list 410. If the payment message does not contain the fields requested by biller B or fields which are not in the format and having the structure preferred by biller B, biller processor 402 will reject the transaction, returning a rejection message to payment network 102A. Because the payment message includes a unique identifier of consumer C in the form of consumer C's PRN, the rejection message can easily be routed back to consumer C via service bureau S. Alternatively, S could debit C's account at Bank C via the ACH, receive those funds, then credit Biller B again through the ACH with funds moving from S's account to B's account at Bank B.

Another condition under which biller processor 402 will return a payment message is where a biller has indicated on biller generation list 410 that payments from a particular consumer are not to be accepted. One reason a biller might choose not to accept a payment from a consumer is where there is an ongoing dispute between the consumer and the biller such that acceptance of payment from a consumer would adversely affect the biller's remedies in the dispute.

Another instance where payment message rejection might be useful, is where the error in payment message is such that customer service desk 404 can correct the situation. Without such a process, biller B would simply have to reject the payment message and deal individually with consumer C outside of bill pay system 400, whereas in bill pay system 400 exceptions can be routed to customer service desk 404 and handled from there rather than waiting for a consumer or biller complaint.

In some cases, biller B might want to be the initiator of a message, such as an electronic invoice or statement which biller B directs biller processor 402 to send to consumer C through payment network 102A. Biller B might also wish to send consumer C a correction message which updates a bill or statement already received by consumer C or automatically update the data used by C in static files at Bank C or service bureau S used to make payments to biller B. This feature is especially useful in paying utility bills where C-B account numbers depend on meter reading route numbers which change as routes change. The biller can send out messages containing the old and new C-B account numbers and have Bank C or service bureau S automatically update C's lookup tables used to generate payment messages.

Bill payment system 400 can also be used for non-bill payment transactions, such as recharging a stored value card held by consumer C. Because each consumer is uniquely identified within the universal participant file 406, a consumer can recharge a stored value card in an amount indicated by a recharge message which results in funds being withdrawn by an account at consumer bank C held for consumer C.

Although bill payment system 400 has been described with reference to a consumer account at consumer bank C, alternative sources of funds can also be used. For example, consumer C can be an unbanked customer where consumer bank C is actually the bank which provides banking services to service bureau S. Of course, a prudent service bureau would secure an alternative source of funds from consumer C, such as accepting cash from a customer at a physical location, a credit card account, or a deposit account with the service bureau S. Alternatively, Bank C may provide a bill payment service to C which uses funding accounts that C may hold at other financial institutions other than Bank C.

Through the use of the universal participant file 406, additional functionality can be provided to billers. For instance, where billers require additional data fields, those can be provided using universal participant file. The biller processor can also use this information to reformat the payment message data into a form which can be easily processed using existing billing systems. For example, where a biller is an insurance company, they might request a policy date with a payment message in addition to a policy number and an identification of consumer. Some billers, however, might request fewer fields than are normally available. This would allow billers to receive data from payment messages in the format expected by their legacy accounts receivable systems.

Yet another advantage of having a bidirectional bill payment system is that consumer C can easily test the correctness of a bill pay order from end to end. One way to perform such a test is to generate a test transaction with a zero dollar value and submit the bill pay order to bill payment system 400. When the zero value payment message is received by biller processor 402, it verifies the data fields of the payment message and responds in a return message to consumer C indicating whether the transaction is in the correct format.

Yet another capability of the system is biller-triggered payments, where the consumer has given preauthorization to the biller to initiate a transaction. The biller then initiates that transaction specifying the consumer's PRN. The transaction is then submitted to payment network 102A as if it was initiated by consumer C.

Figure 14:
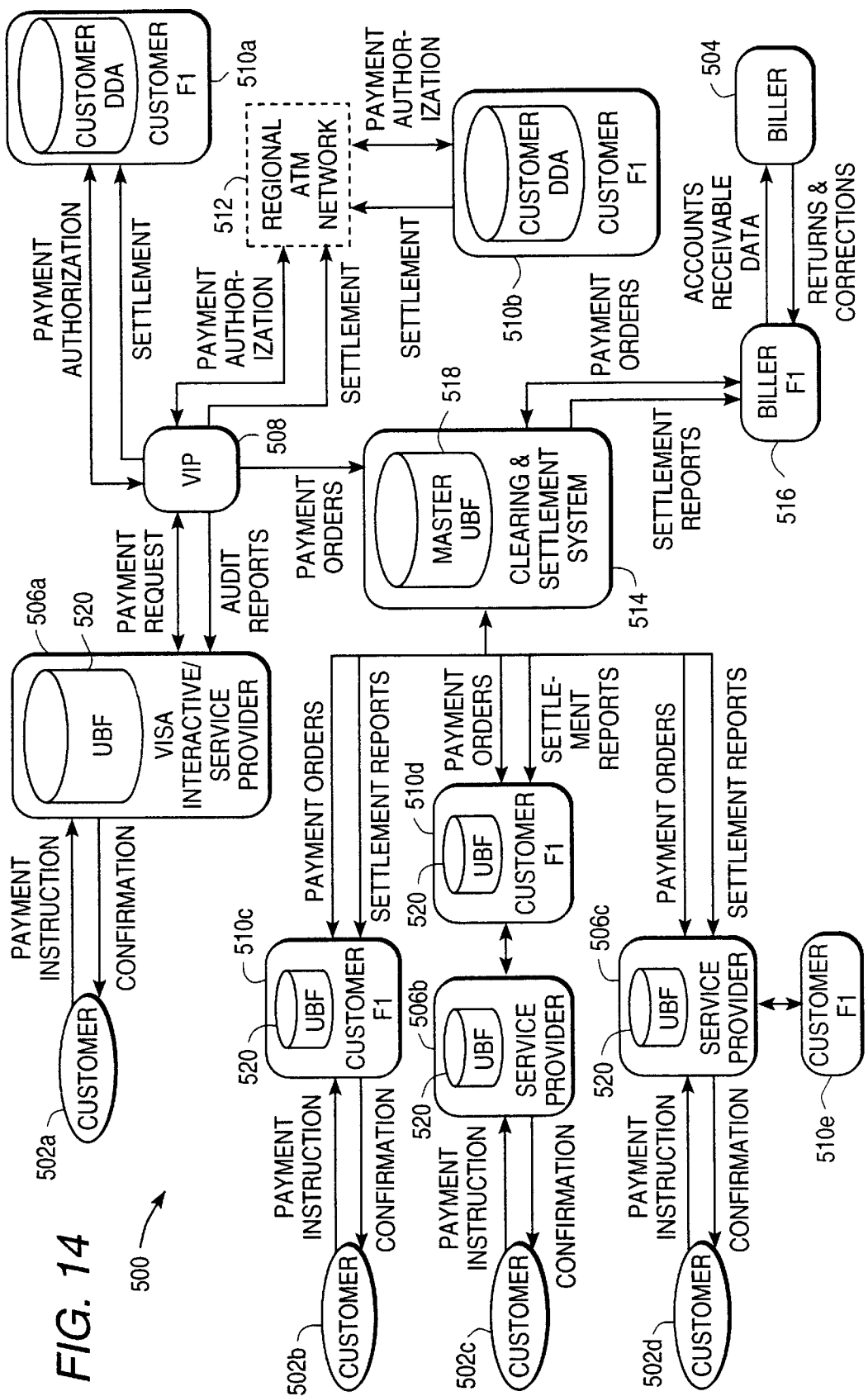
FIG. 14 is a block diagram of a bill payment network showing bill payors using multiple payment initiation configurations interoperating.

Referring now to FIG. 14, a payment network 500 is shown with several bill payment initiation configurations. Four consumers 502A–D are shown, each of which use payment network 500 to pay a bill to biller 504. Several consumer financial institutions, each with a different configuration, are shown. Differing bank configurations are sometimes necessary to accommodate banks' needs and capabilities, as differing consumer end configurations are necessary to accommodate differing consumer preferences.

In one configuration, consumer 502A uses a service bureau to pay bills. The service bureau, similar to service bureau S of FIG. 12, can either be the agent of Bank C or it can be an independent company providing bill pay services to consumers directly on a retail basis. The transaction processor 506A of the service bureau is coupled to the consumer's financial institution via an on-line, real time authorization system 508 using a process similar to that described in FIG. 12, i.e. the VisaNet VIP system. To pay a bill, consumer 502A sends a bill pay order to processor 506A. In response to the received bill pay order, processor 506A sends a payment authorization request through system 508 addressed to the consumer's bank. A consumer can use many different types of accounts as the source of funds, but only DDA's are shown explicitly in FIG. 14. Consumer 502A either uses an account at a bank 510A which is directly connected to network 508 or a bank 510B which is only connected through another intervening network such as an ATM network 512. If an account at bank 510A is used, the payment authorization request is received by bank 510A from network 508. If bank 510A authorizes the payment, it sends a payment authorization message to that effect back to network 508, which responds back to processor 506A at the service provider. Processor 506A optionally sends a confirmation message to consumer 502A. On the other hand, if an account at bank 510B is used, the payment authorization request passes over ATM network 512. Periodically, network 508 will send the payment instructions to a settlement and clearing processor 514, which settles the payments with the biller bank 516 and transmits the bill pay order to biller bank 516, which may reformat it and send it on to biller 504 as A/R data. Settlement is accomplished via clearing and settlement system 514 in a manner as described in connection with FIG. 6.

Consumer 502B interacts directly with her bank 510C to send bill pay orders and receive confirmation. (Bank 510C authorizes the payment order since it is dealing directly with customer 502B. Bank 510C submits payment orders to the network for clearing and settlement.) As discussed above, each bank or service provider uses a UBF (universal biller file) to validate a bill pay order and possibly reformat the bill pay order according to the biller's preferences as expressed in the UBF. FIG. 14 shows a master UBF 518 and satellite UBF's 520. The satellite UBF's 520 are updated from master UBF 518 and might contain less than all records. A satellite UBF 520 need only contain records for billers whose bills are paid through the path containing that satellite UBF 520.

If a bank, such as bank 510D, does not have the capability to interface directly to the consumer's input device, but the bank wants to provide electronic bill pay to its customers, such as consumer 502C, a service provider with a service provider transaction processor 506B similar to processor 506A can be interposed between consumer 502C and bank 510D. Bank 510D submits payment orders for clearing and settlement to biller 516 to the network's clearing and settlement system 514. If the service provider has the capability to interface directly to clearing and settlement processor 514 and the bank either doesn't want to do so or cannot do so, the configuration of a consumer 502D might be used. In that configuration, consumer 502D sends bill pay orders to a service provider 506C which obtains authorizations directly from the consumer's bank 510E and sends bill pay orders through to processor 514. Bank 510E is not directly connected to processor 514.

Typically, service provider 506B has an operating agreement with bank 510D and service provider 506C has an agreement with bank 510E. However, it is possible that service providers will provide services to a consumer regardless of the location of the consumer's account and that banks will accept payment authorization requests from any service providers. As a practical matter, banks may be willing to deal with service providers other than its preferred service provider but only if all participants in a transaction are subject to a defined set of rules, such as might be imposed by the operators of network 508 and/or settlement and clearing processor 514 (which can be either one or two companies).

In each of these configurations, the biller 504 is identified in the bill pay orders, usually by a BRN or a pointer to a look up table of BRN's. From master UBF 518 or a satellite UBF 520, a biller record is obtained which contains the bank ID (BID) for the biller, and possibly the biller's account number at the biller bank 516. This information is used to route the bill pay order to the correct bank and eventually to the correct account. In each of the cases shown, the consumer pays bills according to a relationship the consumer has with a bank or a service provider and the funds are obtained from a consumer account(s) for which the bill payment service is set up.

Figure 15:
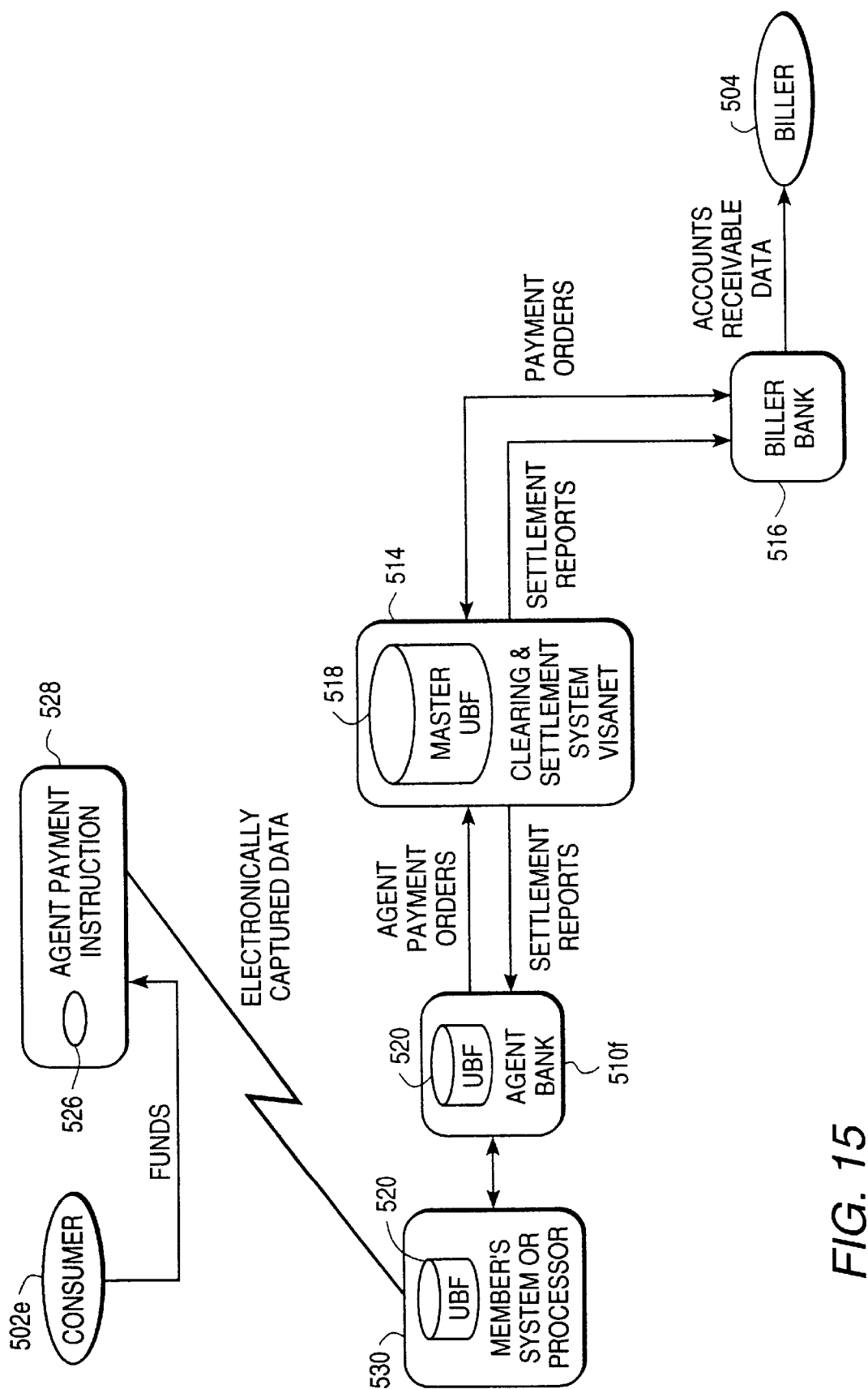
FIG. 15 is a block diagram of a bill payment apparatus with which a bill payor provides funds to an agent and the agent makes a bill payment for the bill payor.

In each of the configurations shown in FIG. 14, the consumer has a relationship with a bank in the payment network and that relationship is used to connect the consumer to the payment system. FIG. 15 illustrates an agent-based bill payment configuration as might be used by a consumer 502E who did not have a relationship with a bank offering electronic bill payment services.

In FIG. 15, consumer 502E would present funds in a form acceptable to an agent 526. Typically, agent 526 is a merchant whose primary business is other than bill payment collection, but might also be a drop-off desk for utility payments and the like. The form of payment might be cash, money order, check, credit card or any other form which is redeemable by agent 326. Once the funds are secured, agent 526 generates an agent payment instruction at an agent processor 528, which is processed by processor 530 into a form suitable for the agent's bank 510F. Agent bank 510F, upon receipt of a bill pay order, sends out the bill pay order and debits the transaction to the agent's account or otherwise secures funds from the agent. The bill pay order then proceeds through processor 514 to biller bank 516 as if consumer 502E used a configuration shown in FIG. 14. Agent bank 510F and biller bank 516 can be one and the same, in which case there is no involvement by 514.

Figure 16:
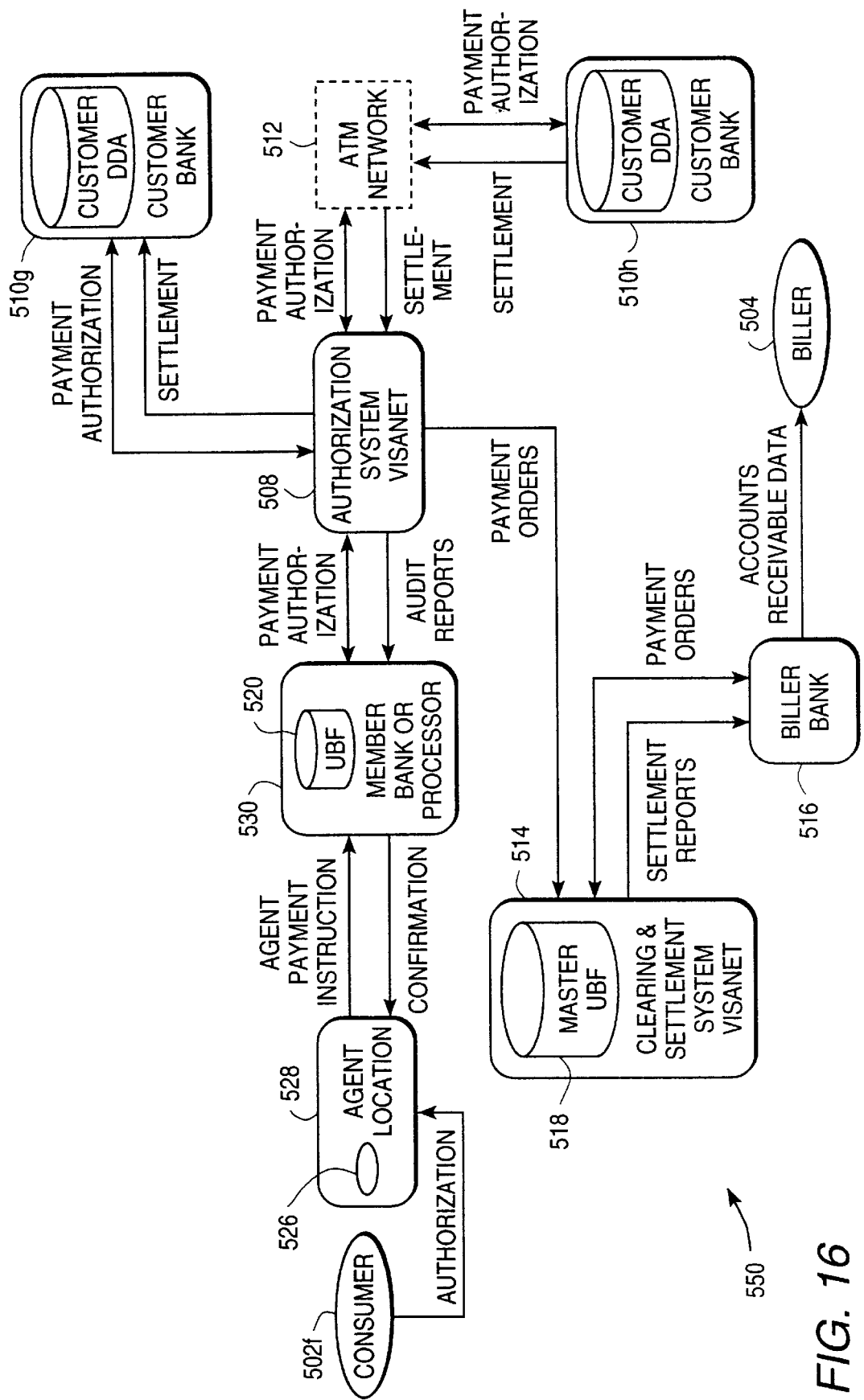
FIG. 16 is a block diagram of a bill payment apparatus with which a bill payor provides authorization for a funds transfer to an agent and the agent initiates a bill payment for the bill payor.

FIG. 16 is a block diagram of a configuration 550 similar to that of FIG. 15, where a consumer 502F has an account (e.g. credit card, checking, etc.) at bank 510G that is electronically accessible via an authorization to move funds to biller bank 516. However, the difference in configuration 550 is that the funds are not given by consumer 502F to agent 526. Only an authorization for a transfer is given. In one embodiment, the authorization can only be given to pay certain billers and certain C-B account numbers as recorded on a bill pay card (not shown). The use of such a bill pay card could also include the information in a magnetically-readable card, which agent 526 might use instead of manually entering the authorization data. The remainder of configuration 550 is similar to the configuration of consumer 502A shown in FIG. 14.

Figure 17:
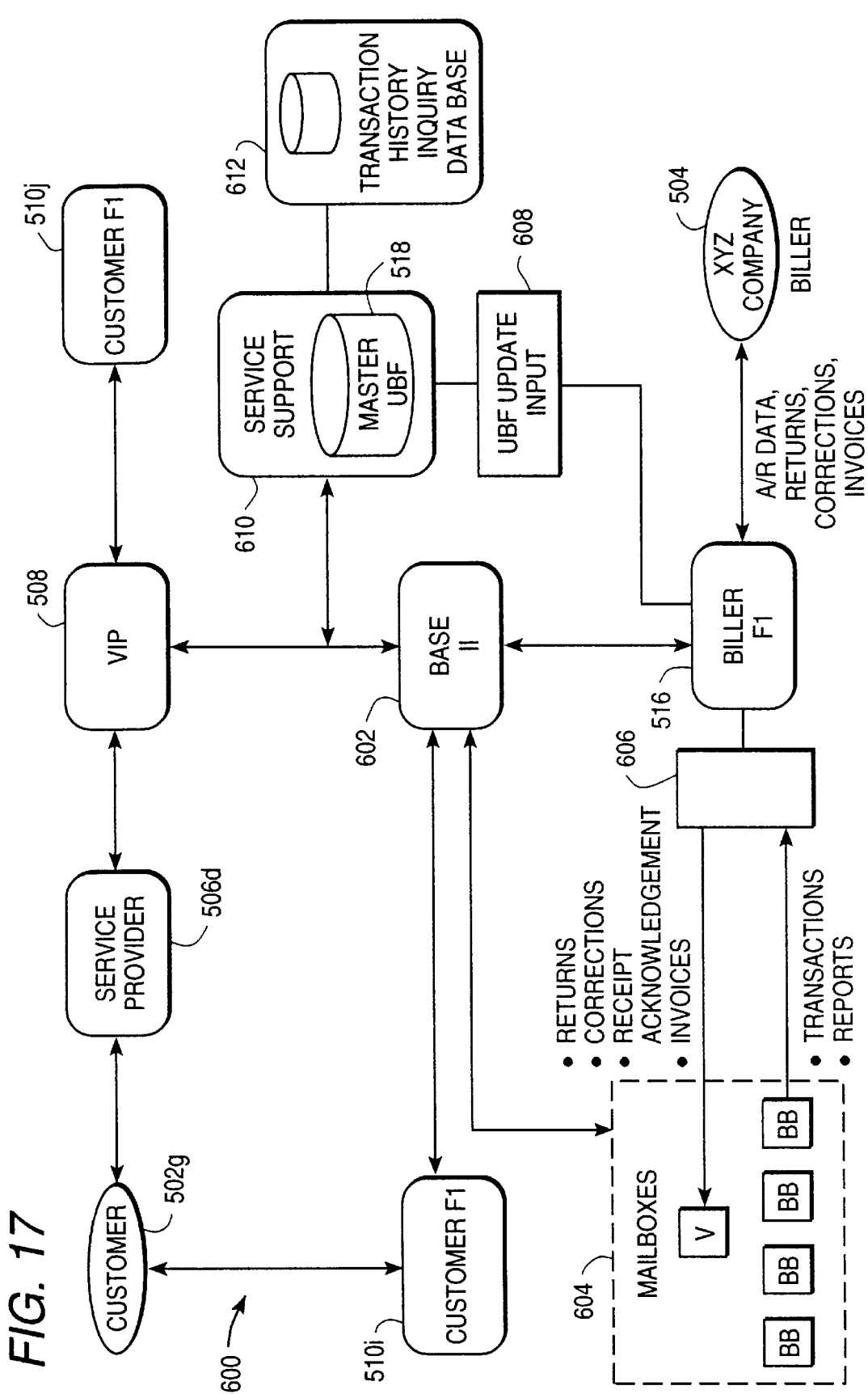
FIG. 17 is a block diagram of an invoice presentment apparatus which might be combined with the payment network shown in FIG. 14.

FIG. 17 is a block diagram of a combined bill payment and invoice presentment system 600. As should be apparent, master UBF 518, network 508 and settlement and clearing processor 514 are the same in each of FIGS. 14–17 where shown and therefore one or all of the configurations shown can coexist in a payment system. In the preferred embodiment, the same payment system is used to route invoices as is used to route bill pay orders. Several paths of message flow (invoice data, bill pay orders, reports, confirmations, etc.) are shown in FIG. 17, essentially to connect consumers and billers. If consumer 502G chooses to deal directly with her bank 510I, then bill pay orders flow from consumer 502G to bank 510I, to the clearing and settlement system (e.g. BASE II network) processor 602, where the settlement occurs. Network processor 602 sends the bill pay order to biller bank 516 which forwards A/R data to biller 504.

An alternate configuration shown in FIG. 17 is where consumer 502G uses a service bureau 506D as her entry into the payment system. Service bureau 506D obtains authorization from the consumer's bank 510J, as described above in connection with FIG. 14, and sends bill pay messages through network 508 to network processor 602, which get to biller bank 516 and biller 504 as described above.

A mailbox system 604 is used to store-and-forward messages to consumer, billers and other participants in the bill pay system. Mailbox system 604 can be used by billers to send back returns, corrections, receipt acknowledgments, and the like. Mailbox system 604 can also be used to send transactions and reports, reformatted by a reformatter 606 as necessary, to biller bank 516 and biller 504. With this bi-directional system, biller 504 can send UBF update instructions 608 over the same network to easily update that biller's records in master UBF 518. A service support desk 610, with its attendant computers and I/O devices 612, can be used to provide message tracking services, auditing services and the ability to field queries from consumers and billers about transactions in the payment system.

Since each consumer is uniquely identified, either by a unique number assigned by the payment network or by a concatenation of a unique consumer bank ID and a bank-assigned number unique within that bank, biller 504 can direct messages to consumer 502G. One message billers would like to send to consumers regularly is an invoice, to save on mailing and printing costs. To send a message containing an electronic invoice, biller 504 sends a message back to the payment network addressed to consumer 502G. However, due to consumer protection rules, regulations and the like, it is often not enough to just send an invoice. Some regulations applied to utilities require information in a specific format with certain minimum information provided. One aspect of the present invention results from the recognition that with proper protocols in place, electronic invoice presentment ("EIP") can displace paper invoices and provide a bidirectional, paperless transaction flow between biller and consumer and back to the biller.

Central to the ability of a payment network to support EIP is the UBF. With EIP, the UBF serves four primary purposes: 1) to identify billers (from an BRN alone); 2) to communicate the EIP and other options a biller is willing to support, precluding the need for bilateral arrangements between consumer financial institutions/service providers ("CFI/SP's") and billers; 3) to support message filtering and validation; and 4) to allow a CFI/SP to choose which services to support.

With a UBF having EIP support, a consumer can initiate several types of messages in addition to bill pay orders. Some of these are shown in Table 2.

TABLE 2

| Type | Description |
|---|---|
| Consumer Activation Request | C (consumer): Sends request to CFI/SP.<br>CFI/SP: Creates/sends a message indicating consumer's preferences and consumer electronic destination ID. In each case, CFI/SP performs standard validations against its service terms and the UBF. In this case, CFI/SP rejects the message if CFI/SP does not support the selected preferences or if the UBF indicates that the biller does not support the selected preferences or EIP.<br>N (network processor; BASE II): Checks preferences against UBF, rejects message if the biller does not support EIP or the selected preferences.<br>BB (biller bank): Receives message, forwards to biller.<br>B biller): Updates its database with consumer preferences and electronic destination, sends confirmation to CFI/SP. |
| Change Invoice Type | C: Sends request.<br>CFI/SP: Standard CFI/SP validation re: invoice type.<br>N: Validates message against UBF. (This validation should not fail if CFI/SP does its job.)<br>BB: Forwards message.<br>B: Updates its database, sends confirmation. |
| Change Consumer Personal Information | C: Sends change record (e.g., to change address, phone number, last name).<br>CFI/SP: Standard CFI/SP validation re: personal information change.<br>N: Validates message against UBF.<br>BB: Forwards message.<br>B: Updates its database, sends confirmation. |
| Change Preferences | C: Sends change record to CFI/SP.<br>CFI/SP: Standard CFI/SP validation checking that new preferences are supported, rejects message if not.<br>N: Validates message against UBF.<br>BB: Forwards message.<br>B: Updates its database, sends confirmation. |
| Change Paper Invoice Delivery Options (if offered by biller) | C: Sends change record.<br>CFI/SP: Standard CFI/SP validation re: paper invoice delivery option change.<br>N: Validates message against UBF.<br>BB: Forwards message.<br>B: Updates its database, sends confirmation. |
| Deactivation Request | C: Sends deactivation request indicating either deactivation of one biller or all billers for the CFI/SP. Consumer must deactivate when changing CFI/SP's since supported functions may differ from CFI/SP to CFI/SP.<br>CFI/SP: Sends deactivation message and/or deactivates consumer.<br>N: Validates message against UBF.<br>BB: Forwards message.<br>B: Updates its database, sends confirmation. |
| Change Invoice Destination Node (used when C changes SP's within same CFI) | C: No network action.<br>CFI/SP: Sends message, matches features of consumer's new location.<br>N: Validates message against UBF.<br>BB: Forwards message.<br>B: Updates its database, sends confirmation. |

TABLE 2-continued

| Type | Description |
|---|---|
| Replacement Invoice Request | C: Sends unique invoice ID in message.<br>CFI/SP: Rejects message if CFI/SP does not support this option, otherwise CFI/SP sends replacement invoice if the invoice data and template are still stored at CFI/SP. If not both stored, CFI/SP sends message to biller requesting replacement.<br>N: Validates message/option against UBF.<br>BB: Forwards message.<br>B: Sends replacement invoice data and/or template. |
| Paper Invoice Request | C: Sends unique invoice ID in message (invoice might be available for only a predetermined time period following the invoice date, such as two billing cycles). CFI/SP: Rejects message if CFI/SP or B does not support this option, otherwise CFI/SP sends message with invoice ID to biller requesting paper invoice.<br>N: Validates message/option against UBF.<br>BB: Forwards message.<br>B: Produces paper invoice per request and sends to C. B can impose permanent paper delivery for consumers who frequently request paper copies using this message type. |

Biller 504 can specify which invoice types it supports. An indication of the supported invoice types for a biller is stored in master UBF 518 and in satellite UBF's 520, and this indication can be updated by biller 504 using UBF updates 608. Invoice types fall into two major categories: 1) limited summary invoices and 2) detailed invoices. A limited summary invoice contains the invoice data without graphics or detail, and can generally be displayed or presented to consumer 502G regardless of the type of consumer terminal used. If biller 504 supports detailed invoices, the biller might also choose to support differing consumer preferences. Thus, a consumer may choose to receive only a summary invoice, or a summary invoice with detailed invoices on request only. Biller 504 can also specify, via the UBF, which consumer invoice presentment devices biller 504 will support. Consumer invoice presentment devices can include personal computers capable of presenting graphics of a specified format (GIF, JPEG, etc.), text-only terminals, screen phones, ATM displays, as well as non-visual presentment devices such as a voice response unit or DTMF response unit where the invoice data is delivered aurally over a telephone.

The ability for biller 504 to specify how an invoice is to be presented is important, because biller 504 may be operating under industry or governmental regulations which require certain minimum information or display to be presented to its customers which requirement is currently fulfilled by the paper invoice. In order for biller 504 to be relieved of its requirement for sending paper invoices, it needs to be able to verify that it sent the invoice data/template to the consumer and the consumer was able to view or hear the invoice information in a way that conforms to the invoice presentment requirements imposed on biller 504.

The requirements might apply to invoice template information (the portions of an invoice which do not change from billing period to billing period or from consumer to consumer) as well as the invoice data (the portions of the invoice specific to a consumer and a billing period). For example, a credit card issuer might be under a regulation that requires that a consumer complaints telephone number be presented in a minimum type pitch and that certain consumer rights be printed on each invoice. If biller 504 is required to include on each invoice a notice in 24-point type that the consumer has a right to dispute an invoice within 60 days, biller 504 can specify in the UBF that it only supports those consumer presentment devices which are capable of displaying 24-point type.

Biller 504 can also specify the handling of paper invoices, such as always mailing paper invoices (an option likely to be used in early stages of adoption), never mailing an invoice unless consumer specifically requests one (using the paper invoice request message as described above), etc. Some billers might be required to specifically notify consumers that certain biller options are no longer supported. This notification can either be by the billers sending messages directly to the consumers affected by the change in supported options, or by the CFI/SP, which can easily detect the change by monitoring their satellite UBF 520 contents.

Other messages are possible in addition to the messages described above. For example, a CFI/SP might need to notify a biller that an invoice is not deliverable to a consumer or that the consumer has not read the invoice within a specified time (such as when a consumer has not read an invoice before the invoice due date). A CFI/SP might also send an "invoice read" confirmation to the biller. The biller can indicate their requirements/preferences in this regard via the UBF.

Additionally billers will also send messages to consumers via the payment network concerning EIP-related matters. For example, if the consumer requests receiving EIP through their CFI/SP and the CFI/SP sends the activation request as described in Table 2 above to biller B via the payment network, biller B will respond with a confirmation message back to C via C's CFI/SP via the payment network. The confirmation message may include confirmation that the biller will begin EIP to the particular consumer as well as the actual starting date.

Figure 18A:
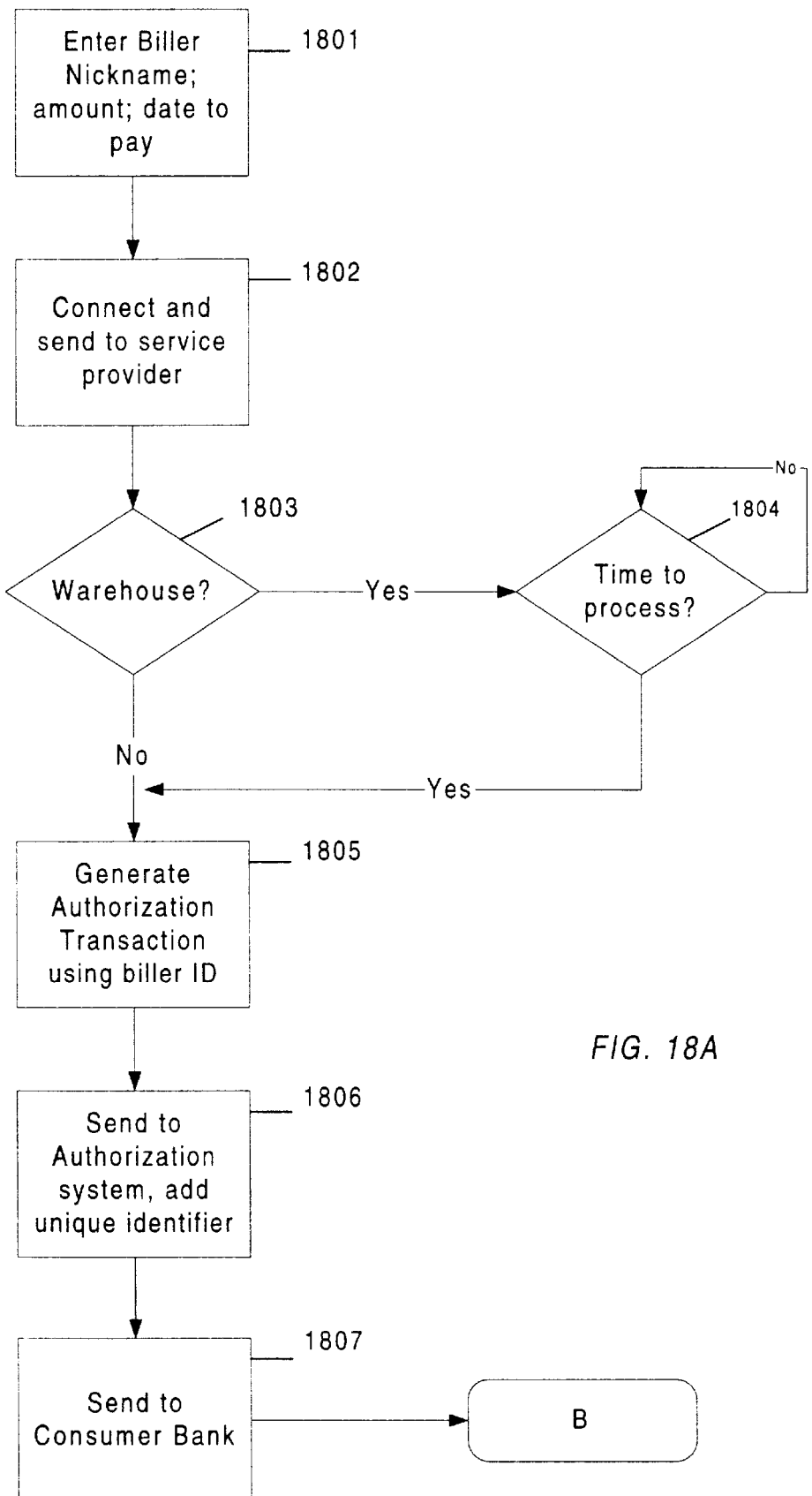
FIGS. 18A–18C are flow diagrams illustrating an electronic payment transaction.
Figure 18B:
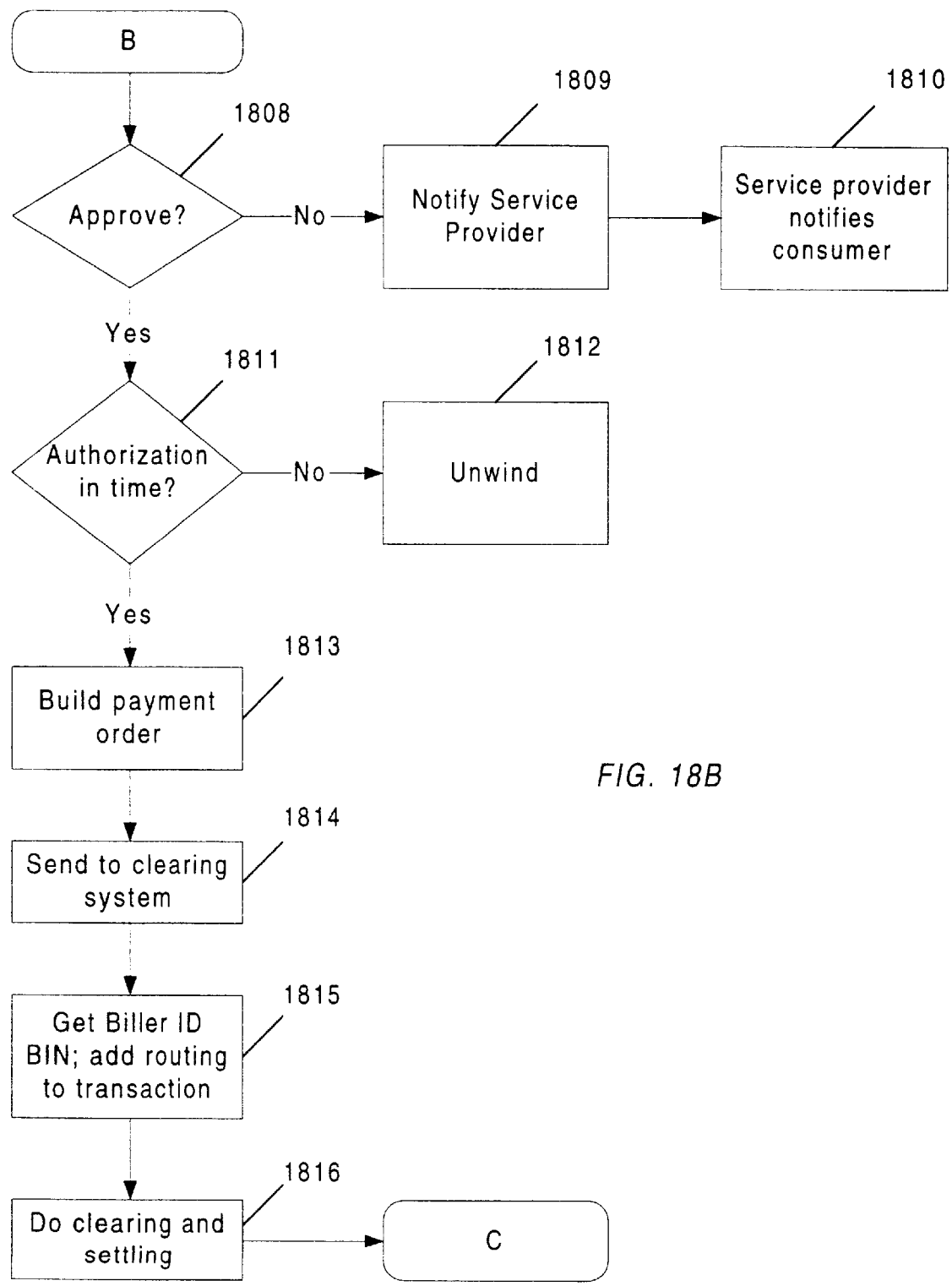
Figure 18C:
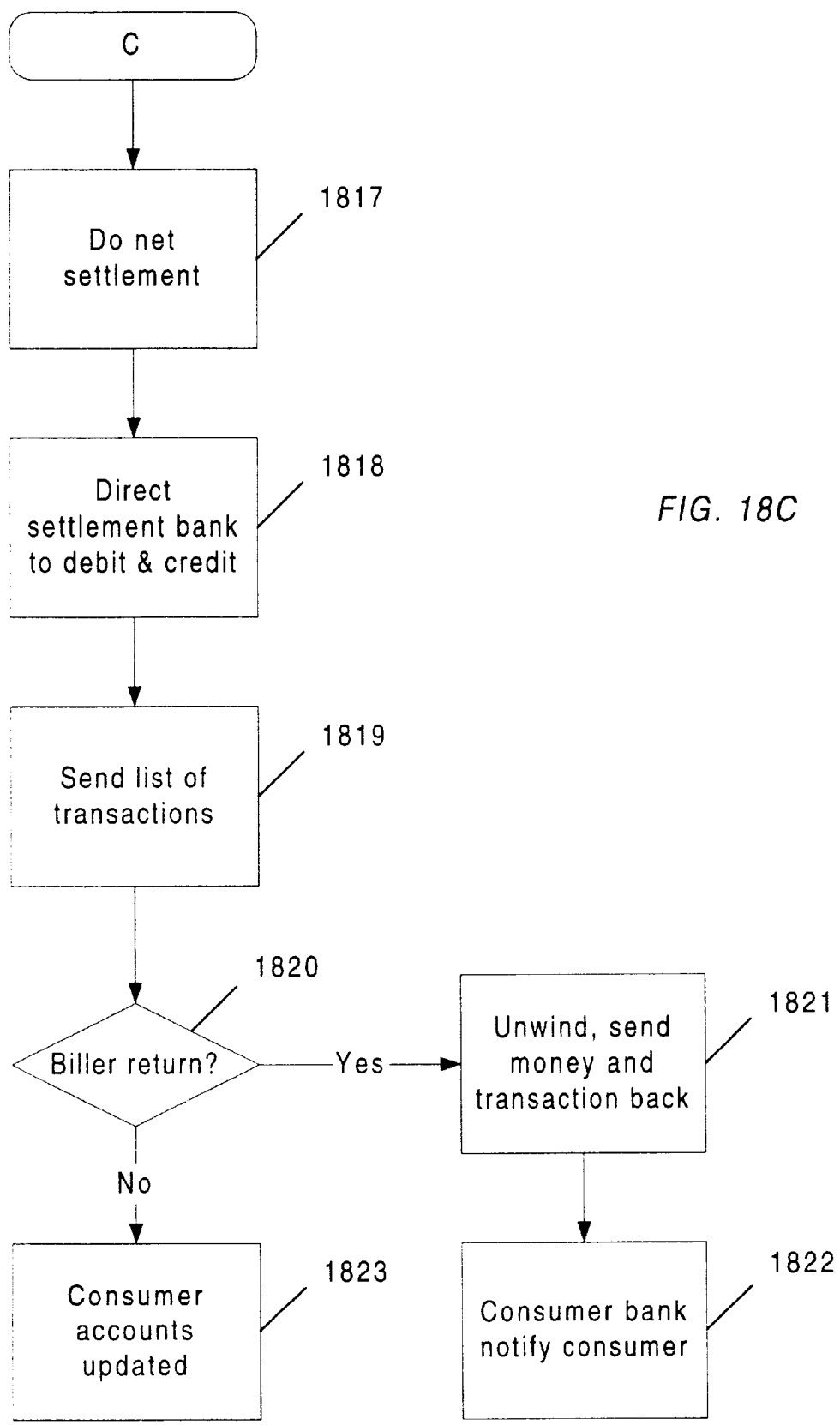

FIGS. 18A–18C illustrate a flow diagram of an electronic payment transaction in an authorization model. Referring first to FIG. 18A at step 1801, a consumer initiates a payment on the consumer's personal computer and invokes payment application. The consumer selects a bill to pay and chooses or enters the biller's nickname, a payment amount, and a payment date. At step 1802 the consumer connects to the service provider to transmit the payment instruction. At this step the service provider checks the consumer's account number on sign-up and matches the biller nickname with the UBF of the biller.

At decision block 1803 the argument "Warehouse?" is made. The decision to warehouse the payment depends on the payment date specified by the consumer. If the argument at decision block 1803 is true, the service provider proceeds to step 1804 and checks the payment date until it is time to process the payment and proceeds to step 1805. If the argument at decision block 1803 is false, the service provider proceeds to step 1805. At step 1805 the service provider generates an authorization transaction using the BID number.

At step 1806 the service provider sends the authorization transaction to an authentication system, such as Visa Integrated Processing (VIP). The authentication system adds a unique identifier to the transaction and timestamps and dates the transaction. In the event of a dispute, the unique identifier and timestamp can be used to provide an unambiguous way to identify the transaction. At step 1807 the transaction is forwarded to the consumer bank.

Referring now to FIG. 18B, at decision block 1808 the argument "Approve?" is made. If the argument is false, meaning the payment is not approved, the consumer bank notifies the service provider at step 1809 via the payment network. At step 1810, the service provider notifies the consumer that the payment was not authorized.

If the argument at decision block 1808 is true, meaning the transaction has been approved by the consumer bank and the consumer bank's approval has been communicated to the payment network, the payment network proceeds to decision block 1811 and the argument "Authentication in time?". This step determines if the transaction was processed in the required amount of time (where the amount of time is regulated). If the transaction is late, the process unwinds at step 1812. If the transaction was not late, it proceeds to step 1813.

At step 1813 the authentication system builds a payment order and sends it to a clearing system at step 1814. This may be done as part of a batch transaction. The clearing and settling system may be a system such as Visa's BASE II system, for example, or any other suitable clearing and settling system. At step 1815 the settling system uses the biller identification BIN from the transaction and adds the appropriate routing information to the transaction. At step 1816 the clearing and settlement is initiated.

Referring now to FIG. 18C a net settlement is performed at step 1817 as is well known in the art. At step 1818 the settlement system directs the settlement bank to debit and credit the appropriate accounts for the transaction. At step 1819 a list of transactions is created and forwarded to the biller bank.

At decision block 1820 the argument "Biller return?" is made. This is the point where a biller can decline a transaction (referred to as a biller return). If the argument at block 1820 is true, the transaction unwinds at step 1821 and the consumer bank notifies the consumer at step 1822. If the argument at decision block 1820 is false, meaning the biller bank accepts the transaction, the consumer account is updated at step 1823.

The above description is illustrative and not restrictive. Many variations of the invention will become apparent to those of skill in the art upon review of this disclosure. Merely by way of example, service bureaus might be interposed between consumers and consumer banks, and between billers and biller banks, as agents of banks which elect not to provide the bill pay service directly to consumers or billers. As another example, messages passed between participants are described above specifically at times, but a message could be interchangeably embodied in a postal mail paper form, an e-mail message, a telephone voice response session, etc. Furthermore, while some participants in the above electronic bill pay system are referred to as consumer banks and biller banks, they need not necessarily fit the legal definition for a bank, but instead may be a savings and loan, a thrift, a credit union, brokerage firm, etc., which maintains accounts for consumers and/or billers and which is coupled to the payment network.

The description above describes preferred embodiments of the present invention. Given external considerations, variations of the embodiments described herein might be preferred by some billers, banks or consumers, however. For example, where a consumer bank provides electronic banking services to a consumer, it is usually an "on-us" arrangement, i.e., where the funds for bill pay transactions come from an account with that same bank. If desired, and acceptable to each of the parties, one consumer bank could be the provider of electronic banking services and a different bank could be the provider of the account from which the funds are drawn.

If desired, a biller may use more than one biller bank. This is useful for national billers who want to use multiple, regional biller banks to collect electronic bill payments. At the time a biller becomes a participant in the service by signing up with a biller bank, the biller can specify, in the UBF, a set of rules which any CFI/SP or the network can use to determine the proper biller bank.

In addition to an invoice being formed from invoice data and invoice templates, an invoice might include "static enclosures" which are electronic references to data and/or displays which are fixed, as well as "dynamic enclosures" such as internet uniform resource locators (URL's).

The scope of the invention should, therefore, be determined not with reference to the above description, but instead should be determined with reference to the appended claims along with their full scope of equivalents.

What is claimed is:

1. A bi-directional bill payment network for transferring funds between a consumer account and a biller account, comprising:

order input means for consumer input of a bill pay order, said bill pay order including at least a reference to a biller identification (biller ID), a payment amount, and an identifier of a consumer-biller account to be credited, wherein said consumer-biller account is used to determine amounts owed to a biller by a consumer;

a first transaction processor, configured to at least process debit portions of accounting transactions against the consumer account;

means for transmitting said bill pay order from said order input means to said first transaction processor;

payment data packet generation means, controlled by said first transaction processor, for generating a payment data packet based on said bill pay order, said payment data packet comprising at least data fields indicating said biller ID, said payment amount and said consumer-biller account identifier;

an electronic packet transfer network which electronically couples said payment data packet generation means at an originating node to a plurality of similar nodes, said electronic packet transfer network including destination translation means for translating said biller ID field of said payment data packet into a pointer to a destination node;

means, coupled to the electronic packet transfer network, for uniquely identifying the consumer;

a second transaction processor located at said destination node, configured to at least maintain a balance of the biller account and process credit portions of accounting transactions against the biller account;

payment data packet accepting means, coupled to said electronic packet transfer network and to said second transaction processor, for accepting said payment data packet from said electronic packet transfer network and applying a credit transaction to the biller account according to said payment amount field of said payment data packet; and a biller accounts receivable data processor, coupled to one of said electronic packet transfer network or said payment data packet accepting means, which processes biller data included in said payment data packet and provides said biller data in a form used by said biller to update said consumer-biller account to reflect a credit based on to said payment amount.

2. The apparatus of claim 1, further comprising a message return means for returning messages from the biller to the consumer using the means for uniquely identifying the consumer to route the returned messages.

3. The apparatus of claim 1, wherein said destination translation means includes a universal biller reference data file stored in an electronic mass storage device coupled to said destination translation means, said universal biller reference data file including criteria for consumer-biller account numbers, thereby allowing consumer-biller account numbers in data fields of said payment data packet to be validated by said electronic packet transfer network.

4. The apparatus of claim 3 wherein said universal biller reference data file identifies options supported by said biller including one or more of options including, but not limited to, ability to support electronic invoice presentment, two way communication, test transactions, processing commercial payments, summary invoices, and detailed invoices.

5. The apparatus of claim 1, wherein said universal biller reference data file is a universal participant reference file comprising a list of unique participant identifiers, wherein a unique participant uniquely identifies participant users of the apparatus, including consumers and billers.

6. The apparatus of claim 1, wherein said universal biller reference data file is a universal participant reference data file comprising a list of unique participant identifiers, wherein a unique participant identifier uniquely identifies participant users of the apparatus, including consumers, billers, service providers, banks and customer service desks.

7. An electronic funds transfer network for transferring funds from a consumer account to a biller account, comprising:

order input means for consumer input of a bill pay order, said bill pay order including at least a reference to a biller identification (biller ID), a payment amount, and an identifier of a consumer-biller account to be credited, wherein said consumer-biller account is used to determine amounts owed to a biller by a consumer;

a first transaction processor, configured to at least process debit portions of accounting transactions against the consumer account;

means for transmitting said bill pay order from said order input means to said first transaction processor;

payment data packet generation means, controlled by said first transaction processor, for generating a payment data packet based on said bill pay order, said payment data packet comprising at least data fields indicating said biller ID, said payment amount and said consumer-biller account identifier;

an electronic packet transfer network which electronically couples said payment data packet generation means at an originating node to a plurality of similar nodes, said electronic packet transfer network including destination translation means for translating said biller ID field of said payment data packet into a pointer to a destination node;

a second transaction processor located at said destination node, configured to at least maintain a balance of the biller account and process credit portions of accounting transactions against the biller account;

payment data packet accepting means, coupled to said electronic packet transfer network and to said second transaction processor, for accepting said payment data packet from said electronic packet transfer network and applying a credit transaction to the biller account according to said payment amount field of said payment data packet; and a biller accounts receivable data processor, coupled to one of said electronic packet transfer network or said payment data packet accepting means, which processes biller data included in said payment data packet and provides said biller data in a form used by said biller to update said consumer-biller account to reflect a credit based on to said payment amount.

8. The apparatus of claim 7, wherein said destination translation means includes a universal biller reference data file stored in an electronic mass storage device coupled to said destination translation means, said universal biller reference data file including criteria for consumer-biller account numbers, thereby allowing consumer-biller account numbers in data fields of said payment data packet to be validated by said electronic packet transfer network.

9. The apparatus of claim 8 wherein said universal biller reference data file identifies options supported by said biller including one or more of options including, but not limited to, ability to support electronic invoice presentment, two way communication, test transactions, processing commercial payments, summary invoices, and detailed invoices.

10. The apparatus of claim 7, wherein said order entry means is configured to use pointers to point to at least one of a consumer-biller account number, a biller ID, or a source of funds, the apparatus further comprising a look-up table memory searchable by the first transaction processor which allows conversion of a pointer to a pointed-to actual value.

11. The apparatus of claim 7, further comprising an internal funds transfer computer which transfers funds from the consumer account to a suspense account to secure funds from the consumer account to cover said payment amount of a payment data packet transmitted over said electronic packet transfer network.

12. The apparatus of claim 7, wherein said payment amount is denominated in a first currency by said second transaction processor and is denominated in a second currency by said first transaction processor.

13. The apparatus of claim 12, wherein the first transaction processor further comprises currency conversion means for denominating the debit portion of the accounting transaction to the consumer account in a third currency.

14. The apparatus of claim 7, wherein said order input means is a personal computer operated by said consumer which includes means for transferring data from said personal computer to the first transaction processor including data representing an information content of said bill pay order.

15. A method of paying bills electronically, wherein funds are effectively transferred between a consumer and a biller, comprising the steps of:

accepting a payment amount and a biller identification (ID) from the consumer;

converting said payment amount and said biller ID into a bill pay order, which bill pay order is stored as an electronic data record;

transmitting said bill pay order to a first transaction processor, said first transaction processor being a computer configured to apply debit portions of accounting transactions against said consumer account;

obligating a consumer for said payment amount;

transmitting an outbound payment data packet from said first transaction processor to an electronic payment network, said outbound payment data packet including at least data fields indicating said payment amount, said biller ID and an indication of a consumer-biller account number;

identifying, from said biller ID field of said outbound payment data packet, a destination node for said outbound payment data packet and a destination account identifier (ID);

transmitting an inbound payment data packet from said electronic payment network to a second transaction processor located at said destination node, said inbound payment data packet including at least data fields indicating an inbound payment amount and said destination account ID, said second transaction processor being a computer configured to maintain a balance of a biller account and to apply credit portions of accounting transactions against accounts including a biller account identified by said destination account ID;

applying a credit of said inbound payment amount against said biller account using said second transaction processor; and providing at least said inbound payment amount and said consumer-biller account number to a biller accounts receivable data processor.

16. The method of claim 15, wherein said step of providing data to said biller accounts receivable data processor is performed by said electronic payment network transferring an accounts receivable data packet to said biller accounts receivable data processor, said accounts receivable data packet including at least data fields indicating said inbound payment amount and said indication of said consumer-biller account number.

17. The method of claim 16 further including a universal biller reference data file wherein said universal biller reference data file identifies options supported by said biller including one or more of options including, but not limited to, ability to support electronic invoice presentment, two way communication, test transactions, processing commercial payments, summary invoices, and detailed invoices.

18. A method for paying a bill from a biller to a consumer, comprising the steps of:

verifying authority of the consumer to issue a bill pay order;

accepting said bill pay order from the consumer, said bill pay order comprising data elements indicating at least a source of funds, a biller ID, a customer-biller account number assigned by the biller and a payment amount, wherein said biller ID identifies the biller to each consumer;

electronically transmitting an outbound payment data packet from a first transaction processor to an electronic payment network, wherein said outbound payment data packet includes at least said payment amount, said consumer-biller account number and said biller ID, and wherein said first transaction processor is configured to process debits and credits applied to said source of funds;

electronically comparing said biller ID to an index of a biller reference file to determine a destination node for an inbound payment data packet corresponding to said outbound payment data packet;

transmitting said inbound payment data packet from said electronic payment network to a second transaction processor located at said destination node, wherein said second transaction processor is configured to process debits and credits applied to said biller account;

applying a credit to said biller account with said second transaction processor, said credit being in an amount corresponding to a payment amount of said inbound payment data packet;

applying a debit to an account held in favor of said consumer financial institution by an amount corresponding to said payment amount of said outbound payment data packet; and providing, from said second transaction processor, data fields from said inbound payment data packet including at least said payment amount and said consumer-biller account number.

19. The method of claim 18, wherein at least one of said data elements is a pointer to data stored in a look-up table memory coupled to said first transaction processor and said pointed-to data is substituted in said outbound payment data packet for said pointer by said first transaction processor.

20. The method of claim 18 further including a universal biller reference data file wherein said universal biller reference data file identifies options supported by said biller including one or more of options including, but not limited to, ability to support electronic invoice presentment, two way communication, test transactions, processing commercial payments, summary invoices, and detailed invoices.

21. An electronic payment network for transferring funds from a consumer to a biller to pay a bill owed by the consumer to the biller, comprising:

a network coupling transaction processors;

a first transaction processor comprising means for sending an outbound payment data packet to said electronic payment network in response to a bill pay order issued by the consumer, said outbound payment data packet identifying the biller by a biller ID assigned to the biller for use with each consumer who is a customer of the biller and which biller ID is disclosed to consumers desiring to make payments to the biller using said electronic payment network;

a conversion means, coupled to said electronic payment network, for converting an outbound payment data packet to an inbound payment data packet, including a conversion of said biller ID to a destination node and a destination account ID;

a second transaction processor located at said destination node, capable of receiving said inbound payment data packet from said electronic payment network, identifying a biller account from said biller ID, debiting an account by a payment amount included in said outbound payment data packet, and crediting an account by a payment amount included in said inbound payment data packet; and means for crediting the consumer's account with the biller by an amount equivalent to said payment amount included in said inbound payment data packet.

22. The apparatus of claim 21, wherein the electronic funds transfer network further comprises currency conversion means for denominating the debit portion of the accounting transaction to the consumer account in a third currency.

23. The method of claim 21, wherein said step of providing data to said biller accounts receivable data processor comprises the steps of:

determining a desired format from a universal biller file, the desired format being a data format specified by the biller identified by said biller ID;

transferring an accounts receivable data packet from said electronic payment network to said biller accounts receivable data processor, said accounts receivable data packet including at least data fields indicating said inbound payment amount and said indication of said consumer-biller account number, formatted according to said desired format.

24. The apparatus of claim 23 wherein said universal biller file identifies options supported by said biller including one or more of options including, but not limited to, ability to support electronic invoice presentment, two way communication, test transactions, processing commercial payments, summary invoices, and detailed invoices.

* * * * *